US008878656B2

(12) United States Patent
Tidemand et al.

(10) Patent No.: US 8,878,656 B2
(45) Date of Patent: *Nov. 4, 2014

(54) PROVIDING DIRECTIONAL FORCE FEEDBACK IN FREE SPACE

(75) Inventors: Erik Tidemand, Seattle, WA (US); Clayton Chang, Redmond, WA (US); Muneeb Iqbal Karim, Redmond, WA (US); Kent Huntsman, Bethell, WA (US); Alex Garden, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

This patent is subject to a terminal disclaimer.

(21) Appl. No.: 12/821,099

(22) Filed: Jun. 22, 2010

(65) Prior Publication Data

US 2011/0309919 A1 Dec. 22, 2011

(51) Int. Cl.
*H04B 3/36* (2006.01)
*A63F 13/20* (2014.01)
*G06F 3/01* (2006.01)

(52) U.S. Cl.
CPC .............. *G06F 3/016* (2013.01); *A63F 13/06* (2013.01); *A63F 2300/1037* (2013.01); *A63F 2300/1093* (2013.01); *A63F 2300/6607* (2013.01); *G06F 2203/013* (2013.01); *G06F 3/011* (2013.01)
USPC ............................ 340/407.1; 463/39; 715/701

(58) Field of Classification Search
USPC ............... 345/156, 161; 715/701; 463/36–39; 340/407.1
See application file for complete search history.

(56) References Cited

U.S. PATENT DOCUMENTS

| 6,088,020 | A | | 7/2000 | Mor |
| 6,162,123 | A | * | 12/2000 | Woolston ..................... 463/37 |
| 6,256,033 | B1 | | 7/2001 | Nguyen |
| 6,278,418 | B1 | | 8/2001 | Doi |
| 6,512,838 | B1 | | 1/2003 | Rafii et al. |
| 6,539,931 | B2 | | 4/2003 | Trajkovic et al. |
| 6,674,877 | B1 | | 1/2004 | Jojic et al. |
| 6,705,868 | B1 | | 3/2004 | Schleppenbach |
| 6,950,534 | B2 | | 9/2005 | Cohen et al. |
| 7,182,691 | B1 | | 2/2007 | Schena |
| 7,227,526 | B2 | | 6/2007 | Hildreth et al. |
| 7,308,112 | B2 | | 12/2007 | Fujimura et al. |

(Continued)

FOREIGN PATENT DOCUMENTS

CN 1397061 A 2/2003
CN 2720514 Y 8/2005

(Continued)

OTHER PUBLICATIONS

U.S. Appl. No. 12/821,102, filed Jun. 22, 2010.

(Continued)

*Primary Examiner* — Thomas Mullen
(74) *Attorney, Agent, or Firm* — Judy Yee; Sergey Lamansky; Micky Minhas

(57) ABSTRACT

Technology is presented for generating directional force feedback in free space to a user using a mass rotatable about a movable axis. The mass and movable axis are responsive to a control signal to generate a force vector having a direction and a magnitude in three-dimensional space to provide feedback to the user. The force vector is created in response to an event in application executing in a processing device. The force vector represents feedback regarding an event in the application.

20 Claims, 32 Drawing Sheets

(56) References Cited

U.S. PATENT DOCUMENTS

| | | | |
|---|---|---|---|
| 7,317,836 | B2 | 1/2008 | Fujimura et al. |
| 7,367,887 | B2 | 5/2008 | Watabe et al. |
| 7,492,367 | B2 | 2/2009 | Mahajan et al. |
| 7,590,262 | B2 | 9/2009 | Fujimura et al. |
| 7,627,139 | B2 | 12/2009 | Marks et al. |
| 7,704,135 | B2 | 4/2010 | Harrison, Jr. |
| 2005/0030284 | A1* | 2/2005 | Braun et al. ............ 345/156 |
| 2005/0085299 | A1 | 4/2005 | Murzanski et al. |
| 2006/0030383 | A1 | 2/2006 | Rosenberg et al. |
| 2006/0033713 | A1* | 2/2006 | Pryor ............ 345/156 |
| 2006/0075422 | A1 | 4/2006 | Choi et al. |
| 2008/0026838 | A1 | 1/2008 | Dunstan et al. |
| 2008/0152191 | A1 | 6/2008 | Fujimura et al. |
| 2008/0242414 | A1 | 10/2008 | Rofougaran |
| 2008/0252596 | A1 | 10/2008 | Bell et al. |
| 2009/0077504 | A1 | 3/2009 | Bell et al. |
| 2009/0141933 | A1 | 6/2009 | Wagg |
| 2009/0215533 | A1 | 8/2009 | Zalewski et al. |
| 2009/0221368 | A1 | 9/2009 | Yen et al. |
| 2009/0280860 | A1 | 11/2009 | Dahlke |
| 2010/0022300 | A1 | 1/2010 | Chen et al. |
| 2010/0093435 | A1 | 4/2010 | Glaser et al. |
| 2011/0159959 | A1* | 6/2011 | Mallinson et al. ............ 463/37 |

FOREIGN PATENT DOCUMENTS

| | | |
|---|---|---|
| CN | 101329600 A | 12/2008 |
| TW | 200949103 A1 | 12/2009 |
| WO | WO2009059065 | 5/2009 |

OTHER PUBLICATIONS

Qian, et al., "A Gesture-Driven Multimodal Interactive Dance System," 2004 IEEE International Conference on Multimedia and Expo (ICME), 2004, pp. 1579-1582.

Hasegawa, et al., "Human-Scale Haptic Interaction with a Reactive Virtual Human in a Real-Time Physics Simulator," ACM Computers in Entertainment, vol. 4, No. 3, Jul. 2006, pp. 1-12.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Stuart-Watson, "A Simple Force Feedback Accelerometer Based on a Tuning Fork Displacement Sensor", Doctor of Philosophy Thesis in the Department of Electrical Engineering of the University of Cape Town, Apr. 2006, 248 pages.

Verplaetse, "Inertial Proprioceptive Devices: Self-Motion-Sensing Toys and Tools", IBM Systems Journal, Sep. 1996, pp. 639-650, vol. 35, Nos. 3&4, IBM Corp., Riverton, NJ, USA.

Verplaetse, "Inertial-Optical Motion-Estimating Camera for Electronic Cinematography", Master of Science in Media Arts and Sciences at the Massachusetts Institute of Technology, Jun. 1997, 109 pages.

Weston, "Modern Inertial Navigation Technology and Its Application", Electronics & Communication Engineering Journal, Apr. 2000, pp. 49-64, IEEE.

Foxlin, "Chapter 7. Motion Tracking Requirements and Technologies", In K.M. Stanney, editory, 'Handbook of Virtual Environment Technology', Jan. 2002, pp. 163-210, Lawrence Erlbaum Associates Publishers.

Office Action dated Apr. 7, 2013, in Chinese Patent Appl. No. 201110184778.9 filed Jun. 21, 2011.

Amendment dated Dec. 12, 2013, U.S. Appl. No. 12/821,102, filed Jun. 22, 2010.

Amendment dated Dec. 16, 2013, Chinese Patent Application No. 201110184778.9, filed Jun. 21, 2011.

Office Action dated Jun. 19, 2013, Chinese Patent Application No. 201110184664.4, filed Jun. 22, 2011.

Amendment dated Nov. 1, 2013, Chinese Patent Application No. 201110184664.4, filed Jun. 22, 2011.

Office Action dated Sep. 30, 2013, Chinese Patent Application No. 201110184778.9, filed Jun. 21, 2011.

Amendment dated dated Sep. 2, 2013, Chinese Patent Application No. 201110184778.9, filed Jun. 21, 2011.

Office Action dated Jun. 12, 2013, U.S. Appl. No. 12/821,102, filed Jun. 22, 2010.

Chinese Office Action dated Feb. 17, 2014, Chinese Patent Application No. 201110184664.4.

Response to Office Action dated May 4, 2014, Chinese Patent Application No. 201110184664.4.

Office Action dated May 14, 2014, U.S. Appl. No. 12/821,102.

\* cited by examiner

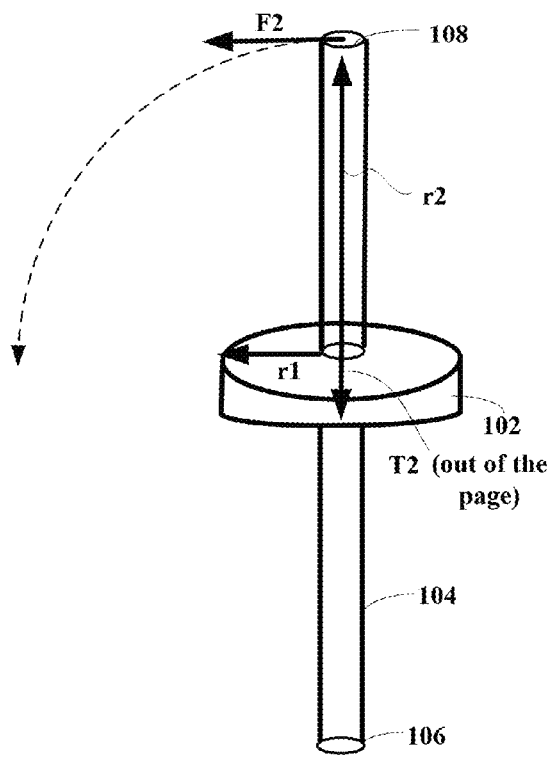
FIG. 1A
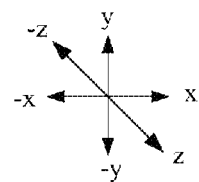
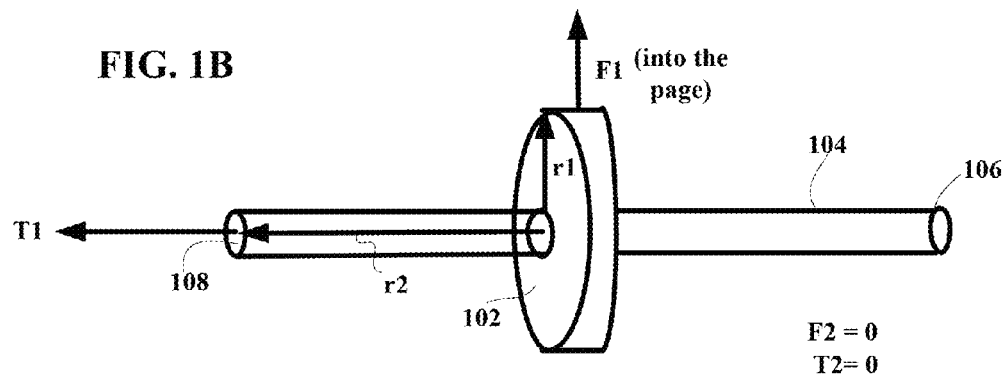
FIG. 1B

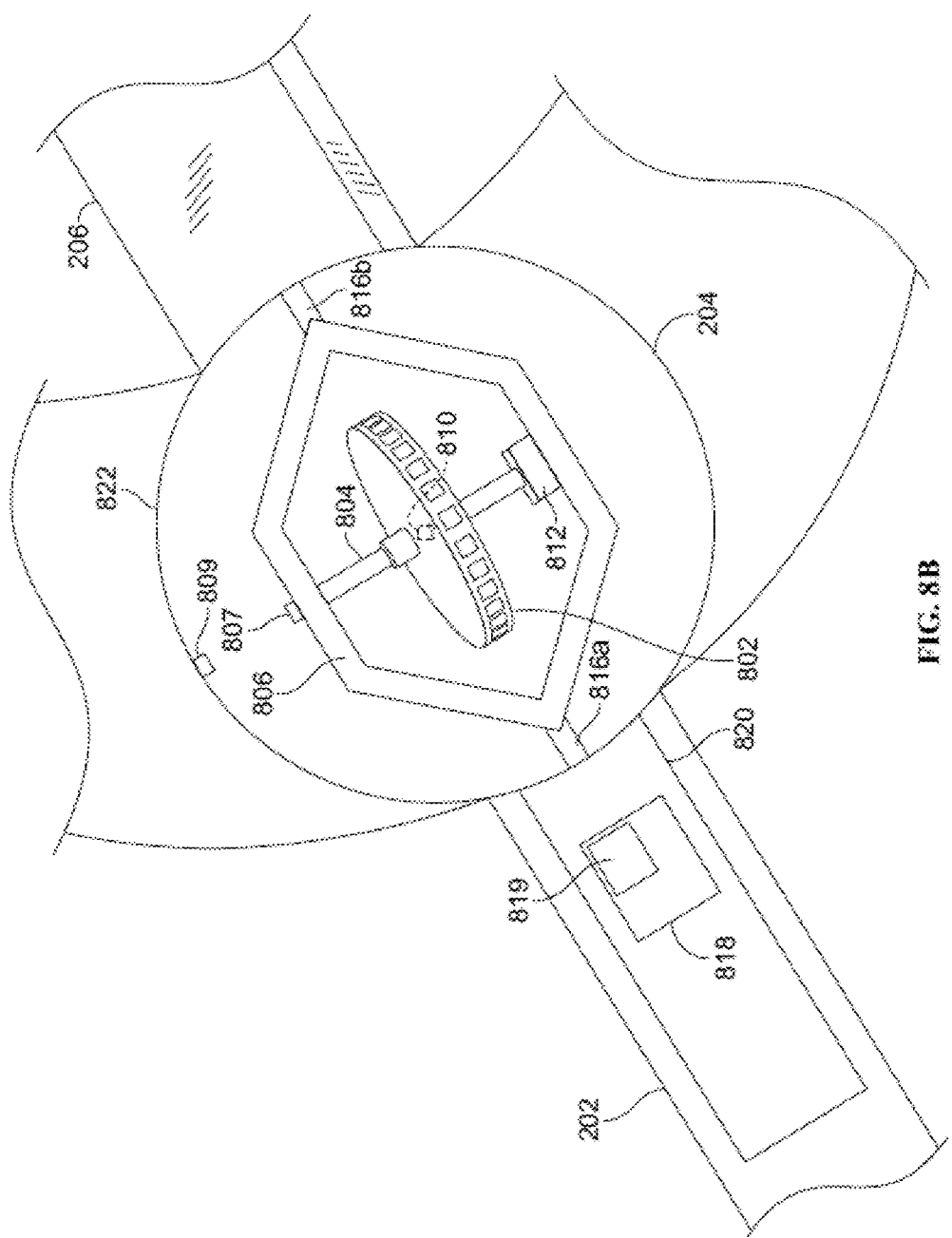

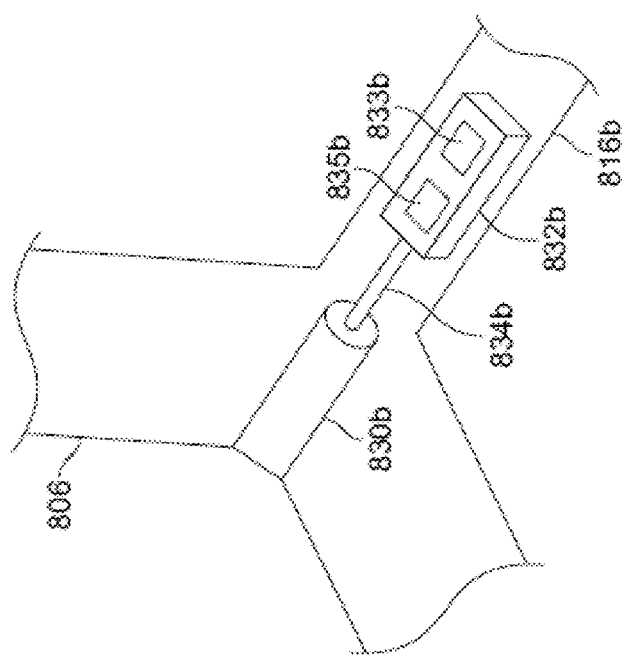
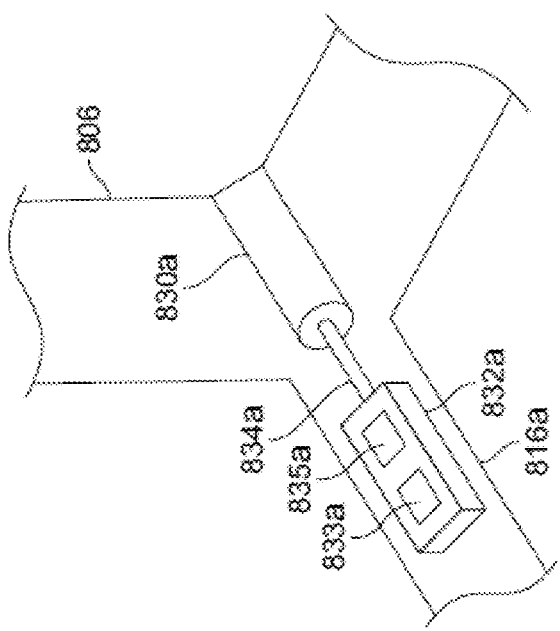
FIG. 9A
FIG. 9B

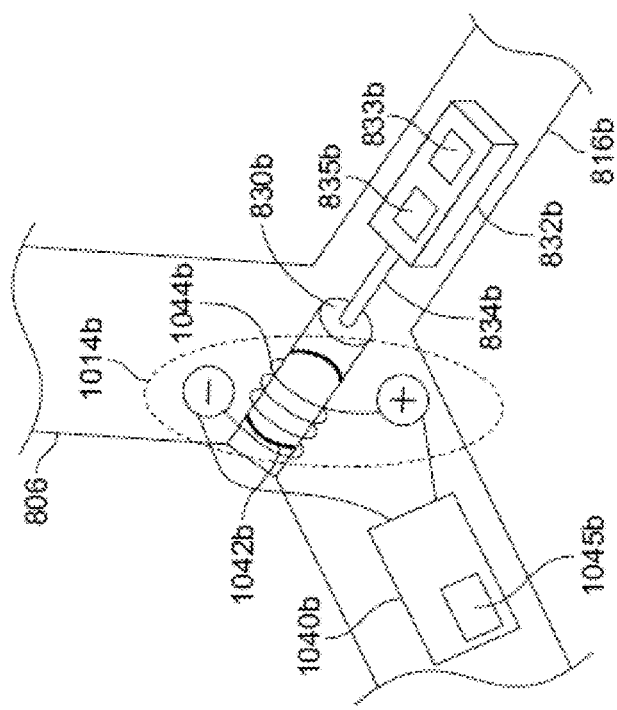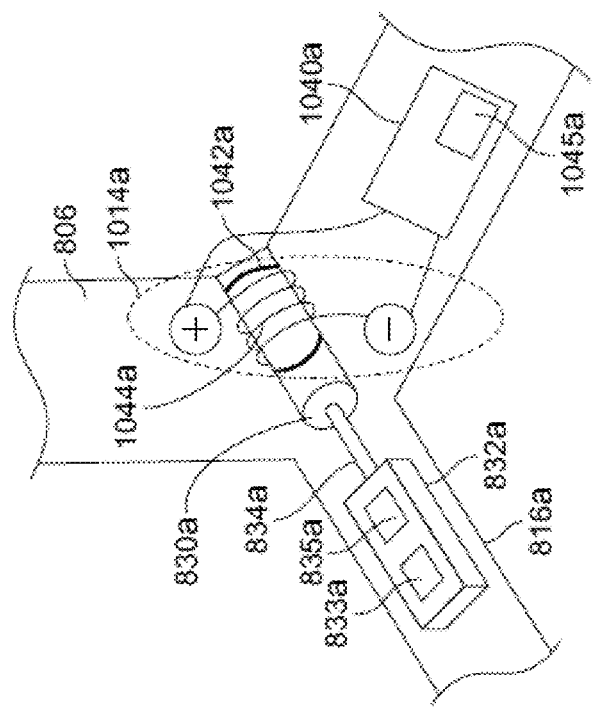

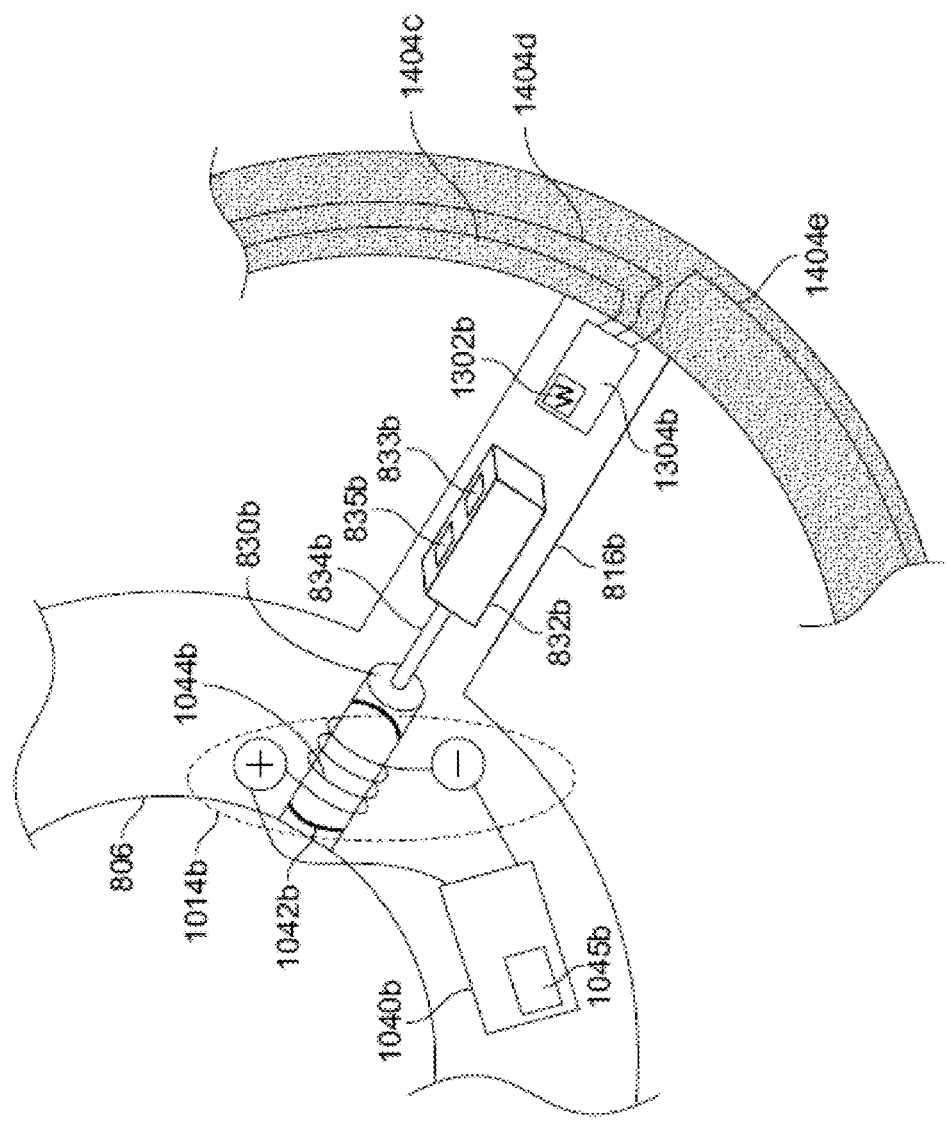

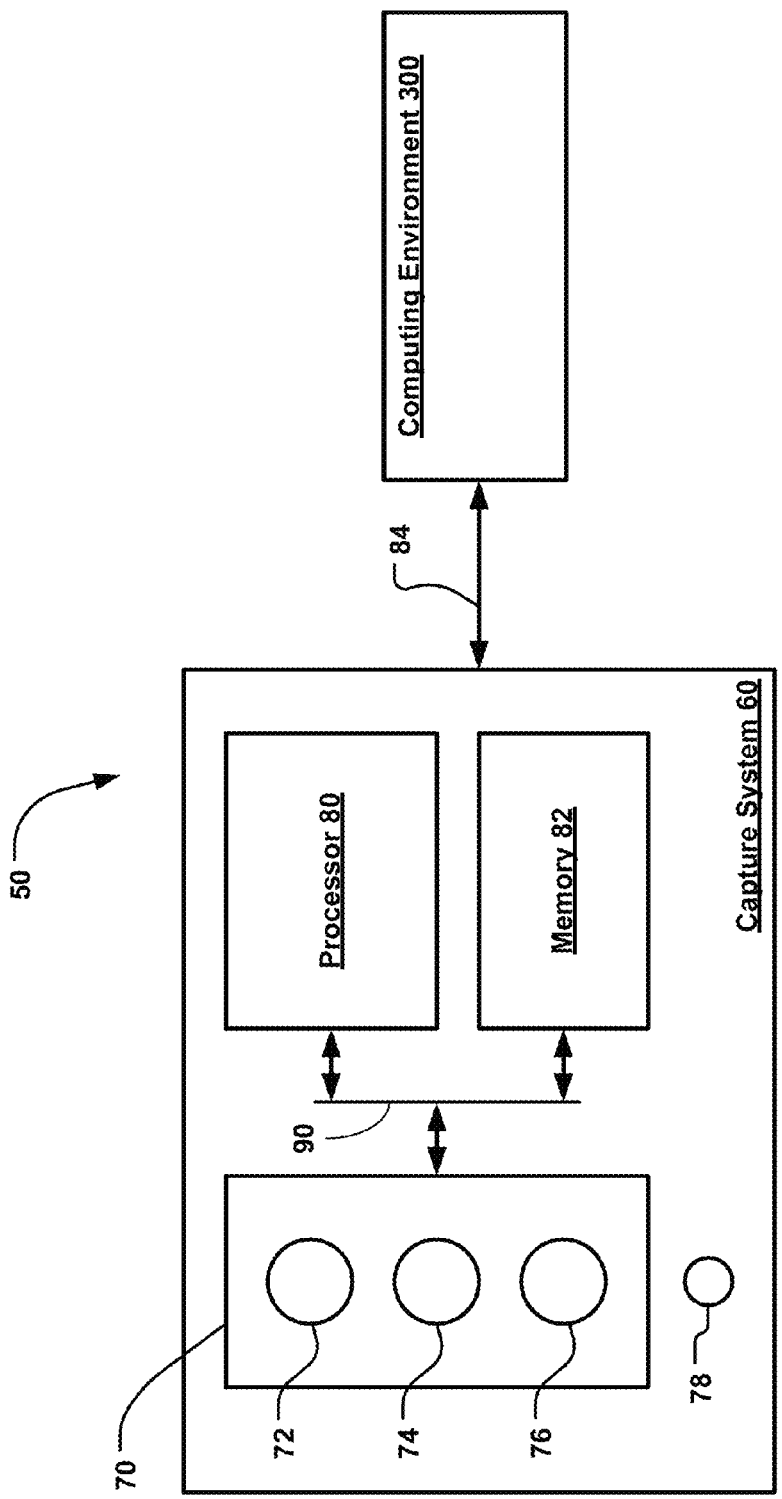

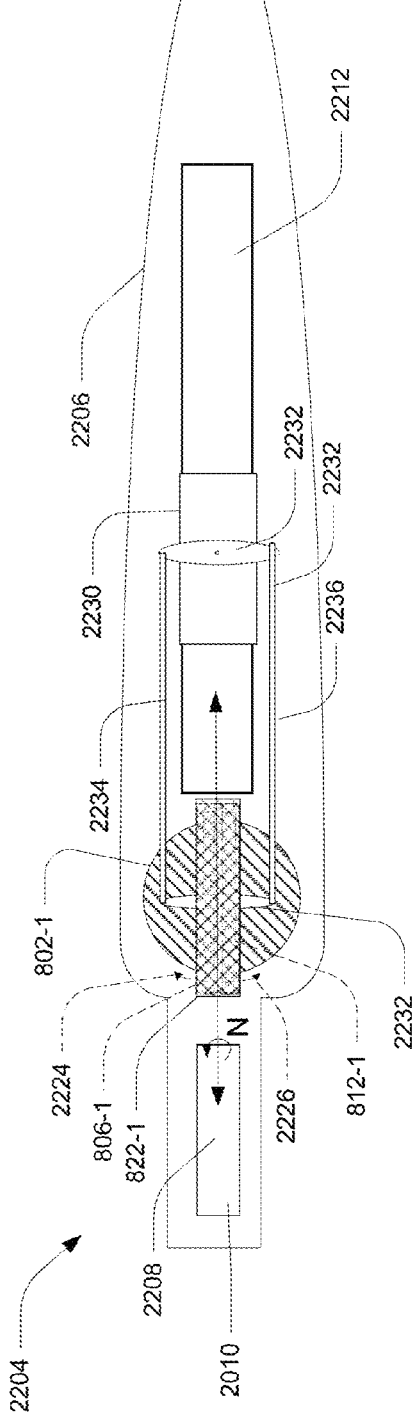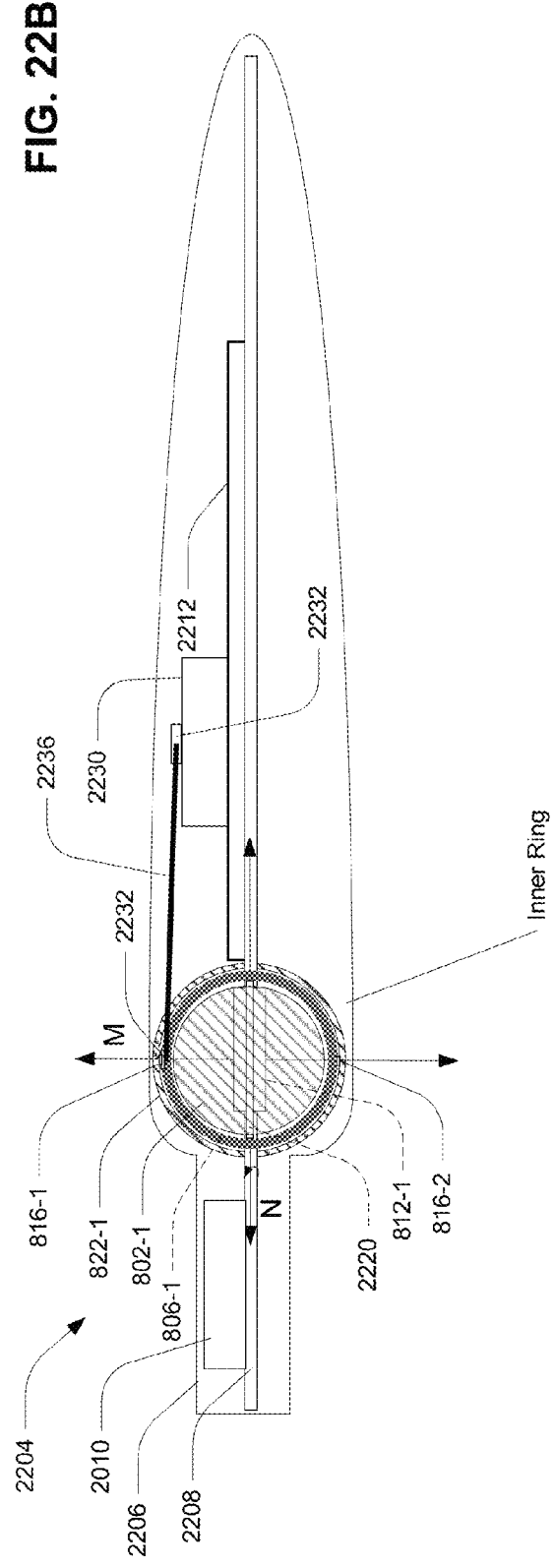

us 8,878,656 B2

PROVIDING DIRECTIONAL FORCE FEEDBACK IN FREE SPACE

CROSS REFERENCE TO RELATED APPLICATION

This patent application has overlapping subject matter description with U.S. patent application Ser. No. 12/821,102, filed Jun. 22, 2010 entitled "FREE SPACE DIRECTIONAL FORCE FEEDBACK APPARATUS" having inventors Erik Tidemand, Clayton Chang, Muneeb Iqbal Karim, Kent Huntsman, Alex Garden, filed concurrently herewith, and hereby specifically incorporated by reference herein.

BACKGROUND

Applications controlled by users on processing devices provide sensory feedback to users in audio, visual and sensory forms. The applications can use the feedback to provide instructions and information, or as a navigational aid. Applications in the entertainment field, such as games, strive to improve a user's experience of actually being in a computer-generated reality. For example, hand held devices using accelerometers and other sensors allow user's physical motions to be translated into a gaming application, and provide vibration feedback based on in-game events.

In virtual reality environments such as those used in games, a user can interact with the virtual environment through an on-screen representation of the user such as an avatar. Events which occur in the game may be translated into feedback into a control device. For example, when a user hits a tennis ball using a movement based controller, the controller may vibrate.

SUMMARY

Technology is presented for generating directional force feedback in free space to a user. The technology uses a mass rotatable about a movable axis. The movable axis can be rotatable about an axis orthogonal to the movable axis, or be coupled to an axial structure and transverse arm which positions the movable axis within a range of movement about a pivot. The mass and movable axis are responsive to a control signal to generate a force vector having a direction and a magnitude in three dimensional space to provide feedback to the user. The force vector is created in response to an event in application executing in a processing device. The force vector represents feedback regarding an event in the application.

The event makes generation of the meaningful in the context of the application. For example, the force to be generated can represent a message to the user. In some examples, the message's meaning can be an instruction or a physical response to a question or action of the user. In another example, the force to be generated can correspond to a virtual force vector being directed on a virtual object in the context of the application, and the virtual object corresponds to the physical object which the user is holding and to which the feedback device is attached. When the directional feedback device generates the force vector, the user holding an object attached to the feedback device or the feedback device itself will receive a force as a result of the generated force vector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The systems, methods and computer readable media embodiments for a directional feedback device for providing directional force feedback in free space in accordance with this specification are further described with reference to the accompanying drawings in which:

FIGS. 1A and 1B illustrate one embodiment of relationships which can generate a torque representing a force to a user.

FIG. 8B illustrates another embodiment of a directional feedback device.

FIG. 9A illustrates a pancake motor system housed in one of the attachment structures of FIG. 8B.

FIG. 9B illustrates another pancake motor system housed in another of the attachment structures of FIG. 8B.

FIG. 11A illustrates an electromagnet housed in one of the attachment structures of FIGS. 10A and 10B.

FIG. 11B illustrates an electromagnet housed in the other attachment structure of FIGS. 10A and 10B.

FIGS. 14B and 14C illustrate another example configuration for sensing changes in the conductive gel with the designated pressure points of FIG. 14A.

FIG. 19 illustrates an embodiment of an image capture system for use with a target recognition, analysis, and tracking system that may be used with one or more embodiments.

FIGS. 22A and 22B show an alternative embodiment of a feedback device formed into a prop.

DETAILED DESCRIPTION

Figure 2:
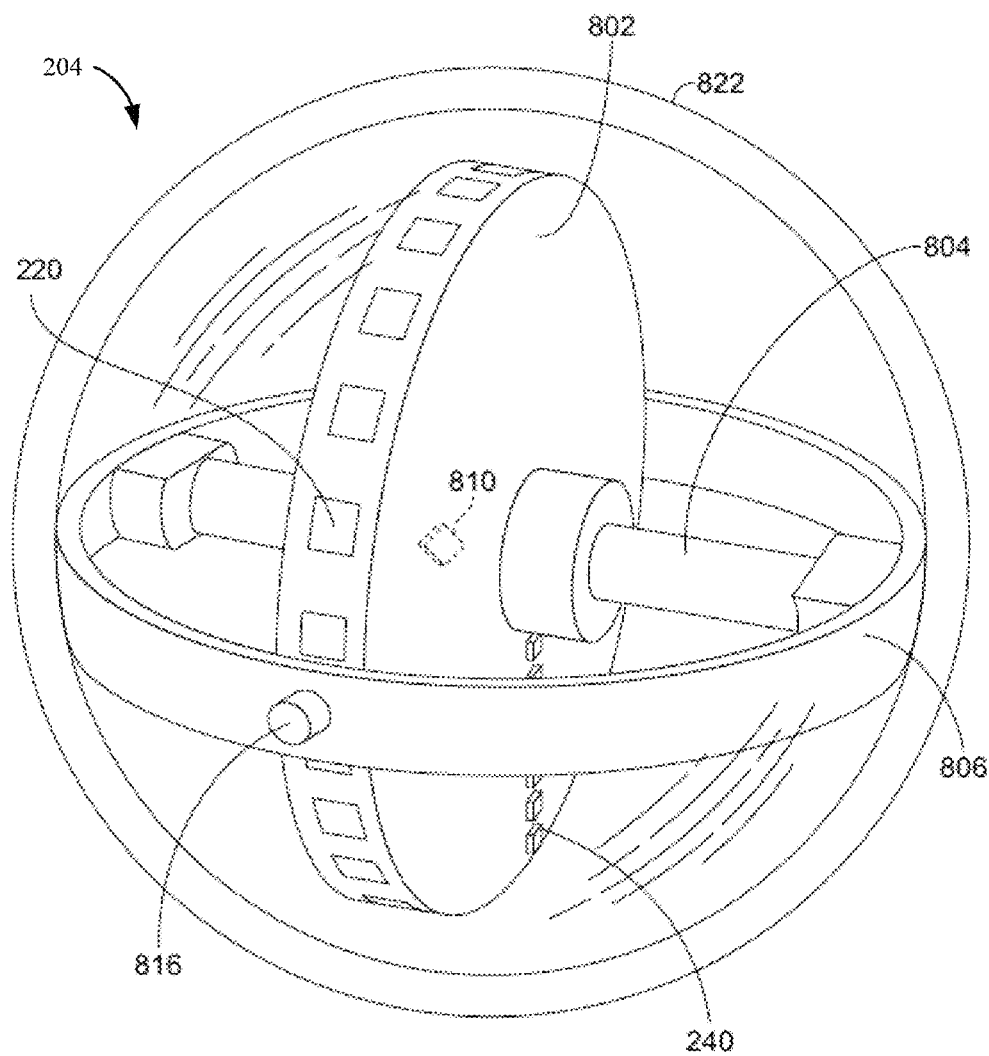
FIG. 2 illustrates an embodiment of a self-contained directional force feedback device.

Technology is presented to provide directional force feedback in free space. Generation of force is provided using a mass which is rotatable about an axis, with the axis being movable. The mass and movable axis generate a force vector having a direction and a magnitude in three-dimensional space to provide feedback to the user. The force vector is created in response to an event in application executing in a processing device. The force vector represents feedback regarding an event in the application. The technology generates a force vector by generating a torque in the mass. The generated torque magnitude and direction is felt by user holding the mass. The torque provides the physical sensation of a force coming from the same direction from which the torque is coming.

FIG. 1A illustrates a relationship between a torque, a force and a position vector for a rotation about a first axis, and FIG. 1B illustrates a relationship between a torque, a force and a position vector for a rotation about a second axis. Force equals mass times acceleration (acceleration is the time rate of change). A position vector "r" represents the distance from a point on the edge of a rotating object to the axis of rotation. This relationship is captured by $T=r \times F$. The magnitude of the torque T is $rF\sin\Theta$. $\Theta$ is the angle between the force on the point on the disk's edge and its distance r from the axis of rotation. This is 90 degrees in this case so $\sin\Theta$ is 1. The magnitude of the torque is determined by the force and the position vector "r." All discussions assume a right handed coordinate system and application of the right hand rule although a left handed coordinate system can be used as well with the technology if desired.

FIGS. 1A and 1B illustrate one embodiment of relationships which can generate a torque representing a force to a user. FIG. 1A illustrates an axial structure 104 with a mass 102, in this example, a disk around its center of gravity. In this example, the center of gravity is the center of the xyz reference coordinate system. The axial structure 104 and as shown later in FIG. 1B, the disk 102, rotate about the center of gravity. In FIG. 1A, the disk is not rotating currently. Force F2 is a rotational force causing axial structure 104 to rotate counterclockwise from the positive y-axis to the negative x axis, -x axis, to a position as shown in FIG. 1B. Although the axial structure 104 is rotating, force F2 is always perpendicular to a point at end 108 at the end of position vector r2. The torque T2 generated by this rotation is always perpendicular to both the force F2 at the point 108 as it rotates, and the position vector r2 as represented by $T2=r2 \times F2$; torque T2 equals the cross product of r2 and F2. Using the right hand rule, the index finger points in the direction of the position vector r2 (y axis). The middle, ring and little fingers curl in the direction of the rotational force F2, from the y axis to the -x axis. The thumb points in the direction of the torque T2, which in this example, is out of the page along the positive z axis.

In FIG. 1B, F2 is now zero so the axial structure 104 is aligned with or parallel to the x-axis and stationery. With no force F2, T2 is now zero as well. In FIG. 1B, the disk 102 rotates about the axial structure 104 under a force F1 at the point on the edge of the disk ending the position vector r1. The force F1 is directed into the page, so using the right hand rule, the torque T1 comes out to the -x-axis, negative x axis, direction out of end 108.

The force the user is to feel is typically of a finite duration. For example, if the torque is to represent a force generated from a contact with another object in a gaming environment, there would be release from the force at the end of the contact. If the contact is a strike, a blow or a hit, it may only last a few seconds at most.

In one embodiment, force F2 can be used to set the direction of the torque T1 by positioning the axial structure 104 at a certain angle. In the examples of FIGS. 1A and 1B, -90 degrees from an initial or home position. Once at the angle for the desired direction, force F2 is removed and force F1 is applied in a certain direction to generate a torque T1 out of the intended end of the axial structure 104. For example, if force F1 is directed out of the page, the disk 102 spins in the opposite direction, and T1 would be directed out of end 106. In one example, to minimize the feeling of the torque T2 generated, the axial structure 104 can be made of lightweight material like a plastic so as not to contribute too much more mass to the disk. Additionally, the axial structure 104 can be moved at a speed much, much slower than the disk speed, thus producing a much, much smaller force F2 and torque T2. For example, the disk speed could be 5000 revolutions per minute (RPM), and the rotation speed of the axial structure could be one tenth that. By keeping the disk spinning longer than the time to direct the axial structure 104 to the desired angle, the user associates the torque T1 with the contact or message being represented rather than the smaller torque T2. In another example, the force F2 can be applied to the axial structure 104 in a quick, rapid burst followed by duration of a longer force time period for the spinning disk producing torque T1.

By directing the axial structure 104 to a certain angle and using the torque generated by the disk 102 rotation, a force vector can be represented in 360 degrees within a plane defined by two axes, in other words along the circumference of a circle.

Having a balanced weighted disk helps keep the perpendicular relationships intact over time to keep the torque directions consistent. The rate of spin or speed can also be used to control the magnitude of the torque and hence the generated force a user senses or feels when holding the physical object. Increasing the speed increases the magnitude of the torque, and decreasing the speed decreases the magnitude of the torque. Torques are generated via a twist about the single allowed axis of rotation coupled with a deflection event. Although the true direction of resultant net torque changes over time, the deflection event occurs with such speed that the experienced rotational force seems unidirectional to a user.

FIG. 2 illustrates one example of a directional force feedback device. This self-contained directional feedback device 204 comprises a support structure 806 enclosed within and attached to a housing, in this example spherical shell 822. Other shapes of the feedback device can be used. The support structure 806 supports axial structure 804 at both ends as it supports disk mass 802 which is centered about the axial structure. Also in this embodiment, control circuitry 810 (see discussion below) is located within the disk, and it interprets instructions for force generation received from a computing environment. In response to the instructions, the control circuitry 810 generates control signals to one or more force generating systems such as motor systems, for example, in a structure like knob 816, and within the disk 802 itself to rotate structure 806 and spin the disk 802. The control circuitry 810 also stops generation of a force in accordance with criteria such as a force time period has ended.

The methodology surrounding the withdrawal of force uses deflection speed. Upon completion of an impact event such that intended directional force is generated, the deflection of the spinning mass ceases, and a slow return to home position is begun. In one embodiment, the mass rotates to a home position at about 45 degrees/sec. such that a user experiences very little discernable torque and the device is ready for a second impact event in short order.

In this example, spherical shell 822 is translucent to allow display elements 240 on the disk rim and display elements on the disk surface to be seen by the user. In other examples, the shell can be transparent. An example of a display element is a light emitting diode (LED). As discussed in more detail below, the control circuitry 810 can receive data via wireless communication from a communicatively coupled computing environment such as a gaming console. The data can be for display by the one or more display elements 220, 240. Some examples of data are colors or images such as compass points or text or video. In some instances, as the disk rotates, data updated to the display elements can also appear to move. The spinning LED bar would form a visually circular display as the plate spins at its top speed. The LEDs themselves are precisely timed to represent all pixels of the display area, as they are spun.

Figure 3:
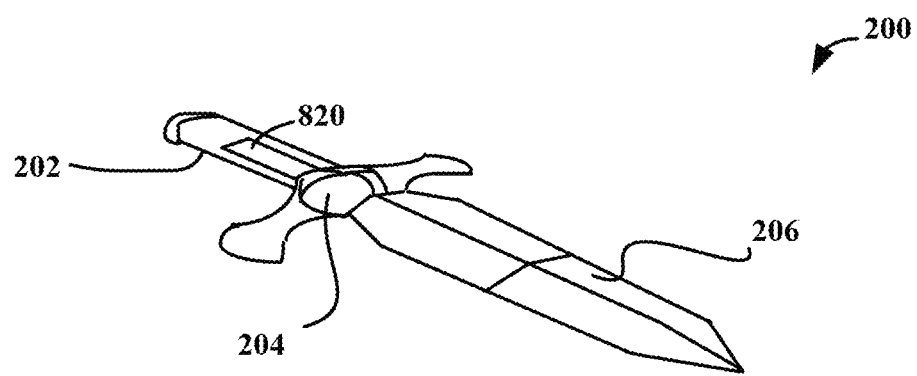
FIG. 3 depicts a toy sword example of a physical object including an embodiment of a free space directional feedback device.

FIG. 3 illustrates a directional feedback device 204 incorporated into a physical object which may be used to enhance game play. In FIG. 3, the physical object depicted is a toy sword 200 which incorporates a directional feedback device 204. The toy sword has a blade 206 and a handle 202 which extends to the sides. This toy sword may be a lightweight, plastic sword.

In this example, a directional feedback device 204 is attached to the sword handle. The attachment can be a simple structural connection such as a strap with self-adhesive fasteners or snaps. In some examples, the physical object can be molded to make a space with fasteners or a form factor into which the directional feedback device fits and snaps in place. In this example, the feedback device 204 comes with a handle portion 820, which also fits into the sword handle 202. By having a structural form factor for attachment of a physical object, a physical object does not need electronic circuitry to interact with the feedback device.

As shown in the example in the drawing, the directional feedback device 204 is small enough in diameter that it can be hand held. In one example, it is less than four inches in diameter.

Figure 4:
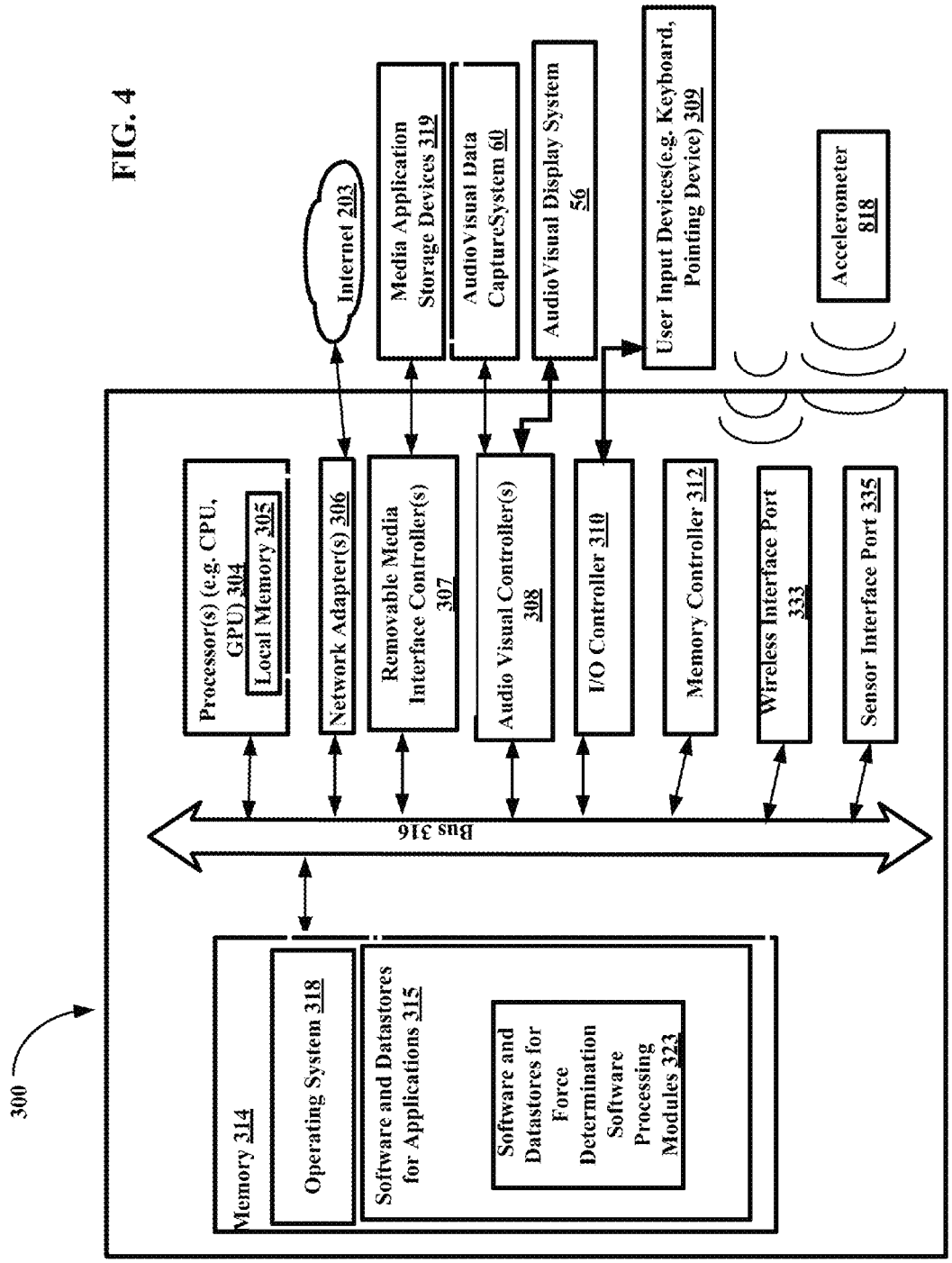
FIG. 4 illustrates an example embodiment of a computing environment for determining a physical force vector by an executing application.
Figure 5A:
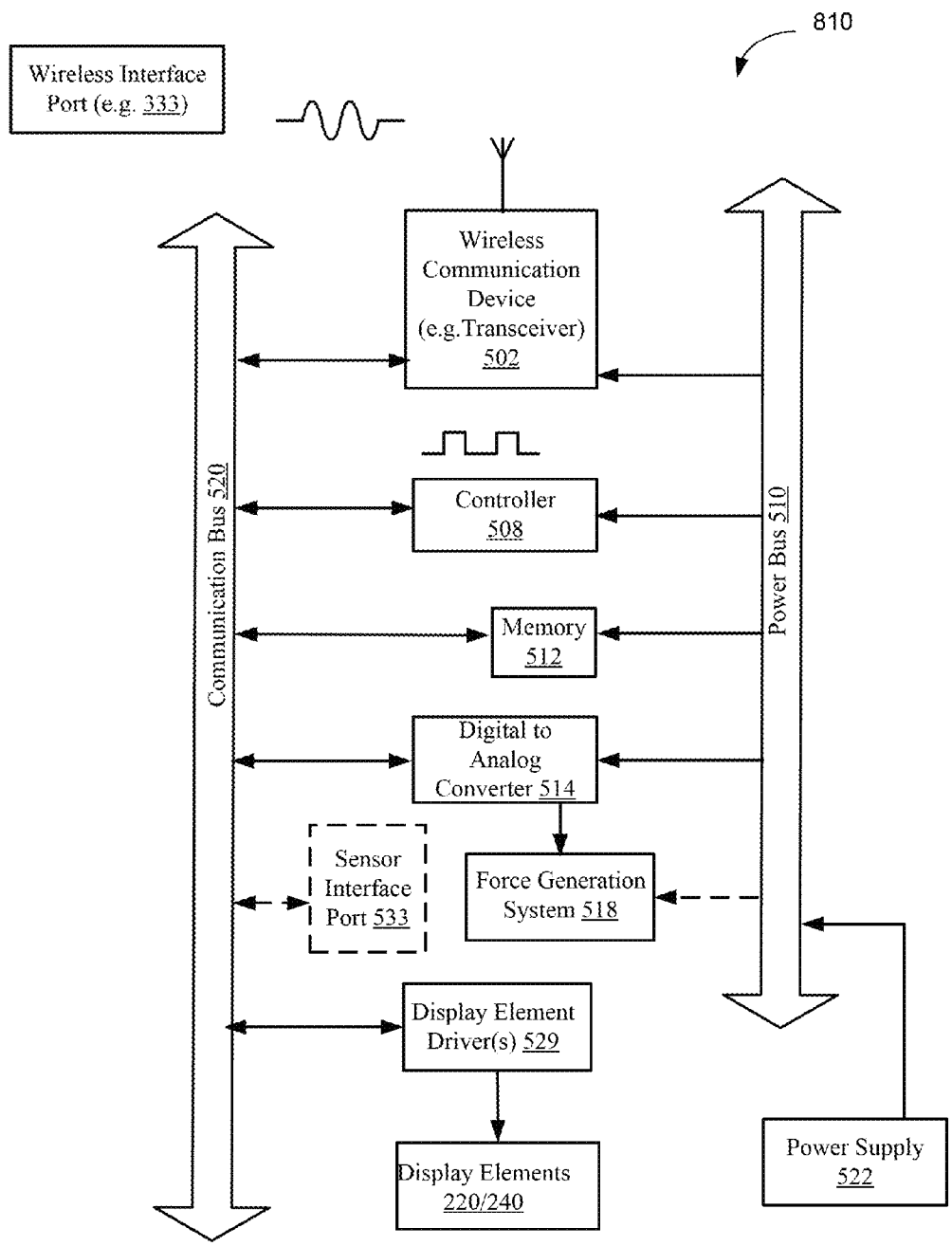
FIGS. 5A and 5B illustrate an embodiment of a control system of a directional force feedback device.
Figure 5B:
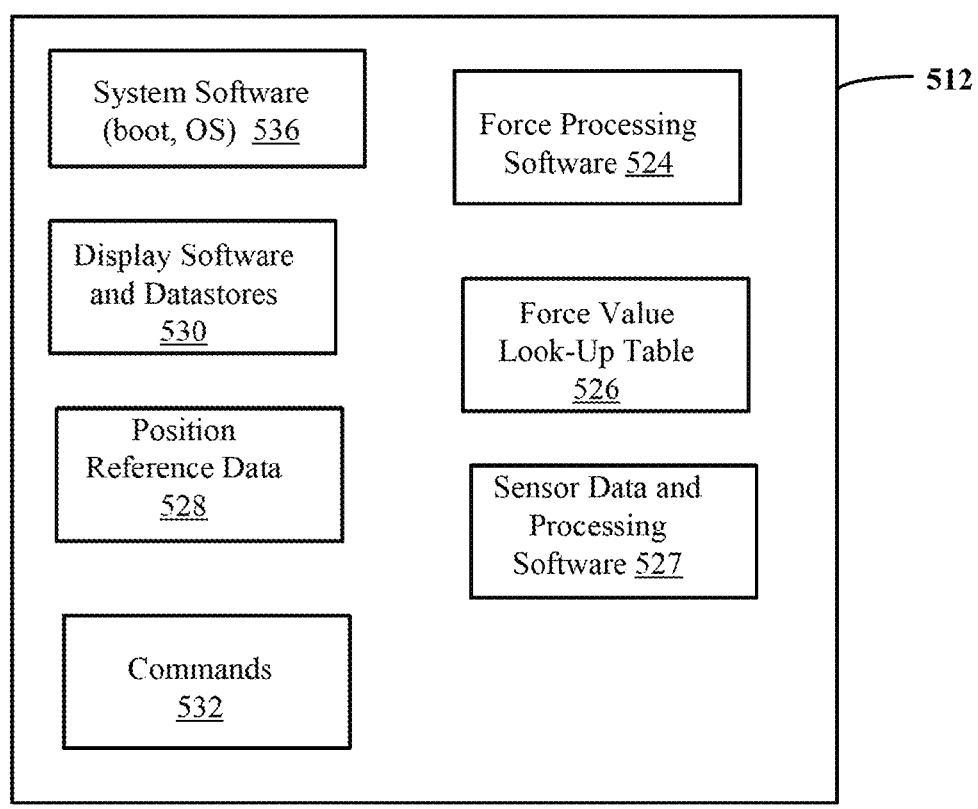

FIGS. 4, 5A, and 5B illustrate computing environments communicating in a system for providing directional force feedback to a user. FIG. 4 illustrates an example embodiment of a computing environment including computer hardware and software components for determining a physical force vector, and communicating its definition to a control system of a directional force feedback device such as that illustrated in FIG. 5A.

Computer system 300 comprises one or more processors 304 which, in addition to at least one central processing unit (CPU), may also include a graphical processing unit (GPU) as the demands of real-time, high motion audiovisual display may require. In this embodiment, the processor(s) are shown having local memory 305 which can embody various cache designs to assist the processor(s) with the high-speed execution demands of real-time visual display of complex scenes.

Figure 16:
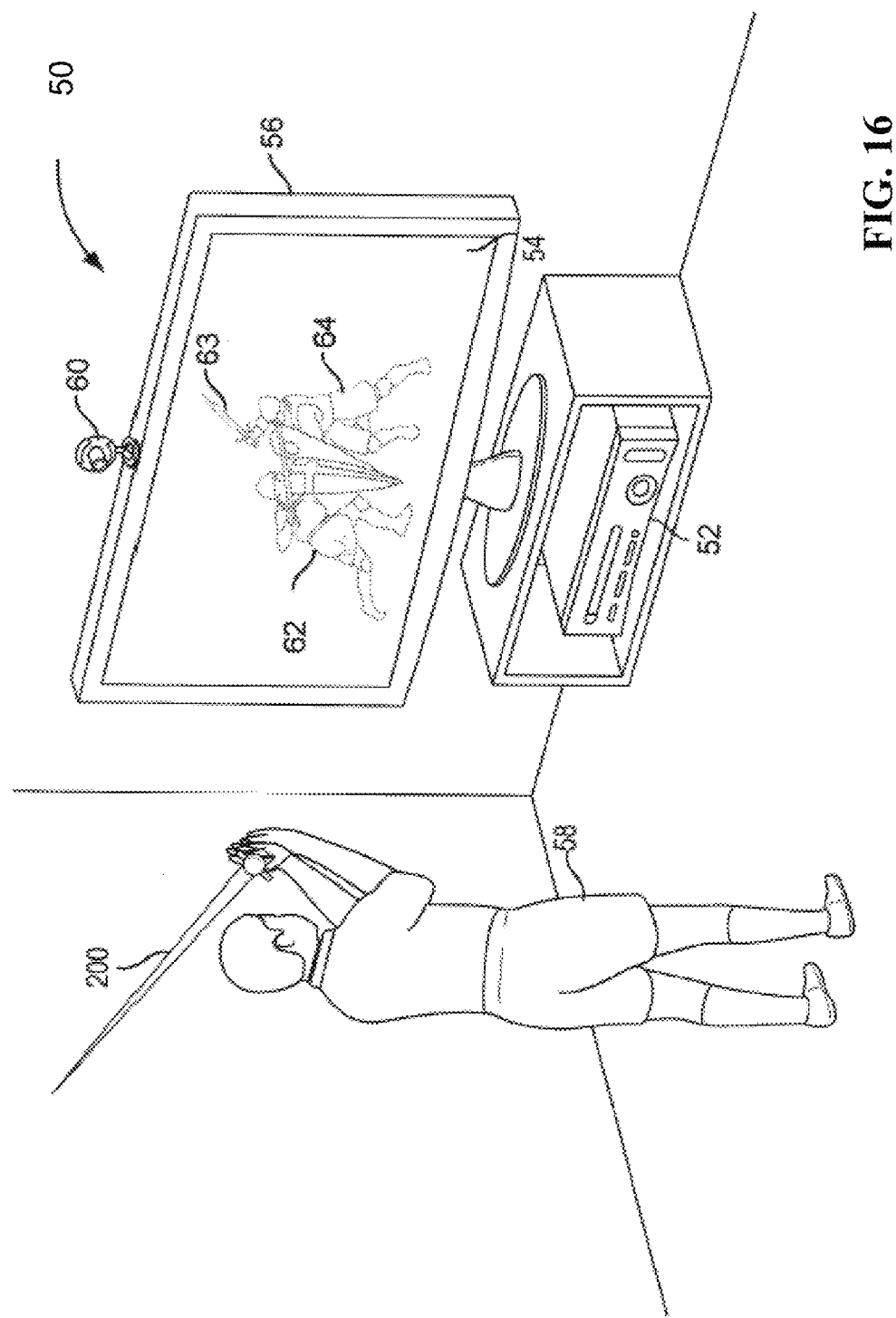
FIG. 16 illustrates an example embodiment of a configuration of a target recognition, analysis and tracking system with a user playing a sword fighting game software application.

The processor(s) 304 are communicatively coupled with other hardware and software components via a computer communication bus 316. One or more network adapter(s) 306 communicate with one or more networks, including the Internet 203 to receive and transmit data for the computer system 300. One or more audiovisual controllers 308 (e.g. graphics cards, sound cards) are communicatively coupled to an audiovisual data capture system (e.g. 60 in FIG. 19) as well as processing units in an audiovisual display system (e.g. 56 in FIG. 16). As illustrated in the example of FIG. 16, the audiovisual display system 56 can be an advanced display system such as a high-definition television (HDTV). In other embodiments, the display may be a lower resolution display, some examples of which include a television, a computer monitor, or mobile device display.

The computer system has an I/O controller 310 for handling input from user input devices 309 such as a keyboard or pointing device (e.g. mouse). One or more removable media interface controllers 307 facilitate the transfer of data and execution of programs stored on media storage devices 319 such as DVDs, CD ROMS, removable hard disks, and memory sticks. Memory Controller 312 directs the transfer of data to and from the various datastores at the behest of applications 315 executing on the processor(s) 304.

The computer system 300 or computing environment 300 further includes a wireless interface port 333 for sending and receiving data wirelessly. Additionally, the system 300 comprises a sensor interface port 335 for receiving wirelessly data from remote sensors such as an accelerometer 818 (see FIGS. 8A, 8B, 10A, 10B) on the directional feedback device 204. In some instances, an accelerometer may send its data or a controller (508) on the feedback device 204 may send accelerometer data via a wireless protocol accepted by the wireless interface port 333. In other examples, the protocol can be another wireless protocol such as infrared light which uses the separate sensor interface port 335.

Memory 314 is representative of the various types of memory present in a typical computer system. These include read-only memory (ROM) for boot software, non-volatile memory for storing the operating system 318 and applications 315, both system and user space applications. The applications 315 include the software and datastores for one or more force determination software processing modules 323 used by one or more applications 315. Some example of such applications can include gaming applications, 3D television applications, navigation applications, and educational applications. The one or more force determination software processing modules 323 determine a physical force vector which is to be generated by the feedback device in accordance with criteria for a respective application. In some embodiments, the force determination software 323 determines the vector definition with respect to the position data from an accelerometer 818 or other orientation sensing devices.

The memory 314 is also representative of the volatile storage such as random access memory (RAM) in its various technology implementations (DRAM, SRAM, etc.) for use when an application is executing on the processor(s) 304.

The various types of memory 314, both non-volatile and volatile, and the media storage devices 319 are examples of computer-readable storage media having encoded thereon computer-executable instructions for performing a method for providing directional force feedback. For example, they can store software and associated data stores, alone or in combination, for a force determination module 323.

The executing applications and modules 323 have access to the operating system 318 and the various information it provides or can access for the application such as the port through which data is received or for which it is destined.

FIG. 5A illustrates an embodiment of a control system 810 of a directional force feedback device. A wireless communication device 502, in this example, a transceiver 502, receives the wireless signal encoded with a definition of a force vector, in this example a direction and a magnitude of the desired force vector, from a wireless interface port 333 of a communicatively coupled computing environment executing an application (e.g. 315). The wireless communication protocol may be Radio Frequency (RF), Bluetooth or one of the IEEE 802 wireless based standards (e.g. 802.11 or 802.16 sets of standards) or any other suitable wireless communication protocol. The transceiver 502 demodulates the encoded signal from a carrier wave, or other format if necessary. If the signal is not already in digital form, the transceiver circuitry converts the baseband analog signal of the data to a digital signal capable of being processed by the controller 508 and other digital components.

The digital signal is sent via communication bus 520 to the controller 508. Examples of types of controllers 408 include, but are not limited to, a microcontroller, a microprocessor, or a plurality of such devices if desired.

Memory 512 is accessible to controller 508. In one example, the memory can include read only memory (ROM) for storing software executable by the controller 508 and random access memory (RAM) for use during the execution of that software. In an embodiment illustrated in FIG. 5B, force processing software application 524 is stored in non-volatile memory, and when executed by the controller 508, determines one or more control messages or signals to send to the force generation module control hardware 518 to represent the force to be generated by the directional feedback device. In one embodiment, a look-up table 526 of force values may be stored in memory 512 from which the controller 508 can select based on the received force definition. In one example, the force values can include data to cause a motor to rotate its shaft to achieve an angle of rotation or deflection and a speed of rotation. The determined one or more values can be converted to one or more analog signals by a digital to analog converter 414. In some embodiments, the analog signal can act as a drive signal to a motor or other force generating mechanism.

As shown in the figures that follow, the feedback device can include accelerometers or other orientation sensors 818 which connect through a sensor interface port 533 to provide their orientation data for the device. In other examples, the sensor 818 transmits its data to the local wireless communication device 502. In other examples, the sensor can also send the data to the wireless interface port 333 of the coupled computer environment.

In this embodiment, the memory 512 further comprises sensor data 525 and sensor processing software 527. Various embodiments of the directional feedback device 204 include at least one accelerometer, typically a 3-axis accelerometer, which gives the orientation of the device 204 with respect to the ground. In one embodiment, the sensor processing software 525 causes the sensor data to be sent to a computing environment wireless interface port 333 for use by its force determination software 323. Definition data for a force vector can be given with respect to an orientation position reference which, for example, can be the position of the accelerometer on the device 204.

The position data of the accelerometers and/or other orientation sensors can be stored in position reference data 528 for use by the force processing software 524. The orientation reference point can be another arbitrary location on the device 204 other than the location of an accelerometer. In this case, the relationship between an orientation sensor location and the orientation position reference is stored as well.

In some embodiments, a home or initial position reference point of the force generation system 518 is a known position from an accelerometer's location on the device. The home position reference point and its positional relationship with respect to the orientation position reference is also stored in the position reference data 528. The force processing software 524 uses this information in calculations in order to represent the requested vector definition with respect to the orientation position reference point's location by a vector definition with respect to the home or initial position of the force generation system 518. Based on the desired rotations with respect to the home position, the force processing software 524 sets the control settings (e.g. values from table 526) for the force generation mechanisms.

Additionally, the control system 810 includes one or more display element drivers 529 which receive instructions and some data from display software 530 executing on the controller 508 for data 530 to be displayed on communicatively coupled display elements (220 and 240). Some data may be stored in non-volatile memory of memory 512, and other data can be received from an executing application 315 on the coupled computing environment 300.

Figure 13A:
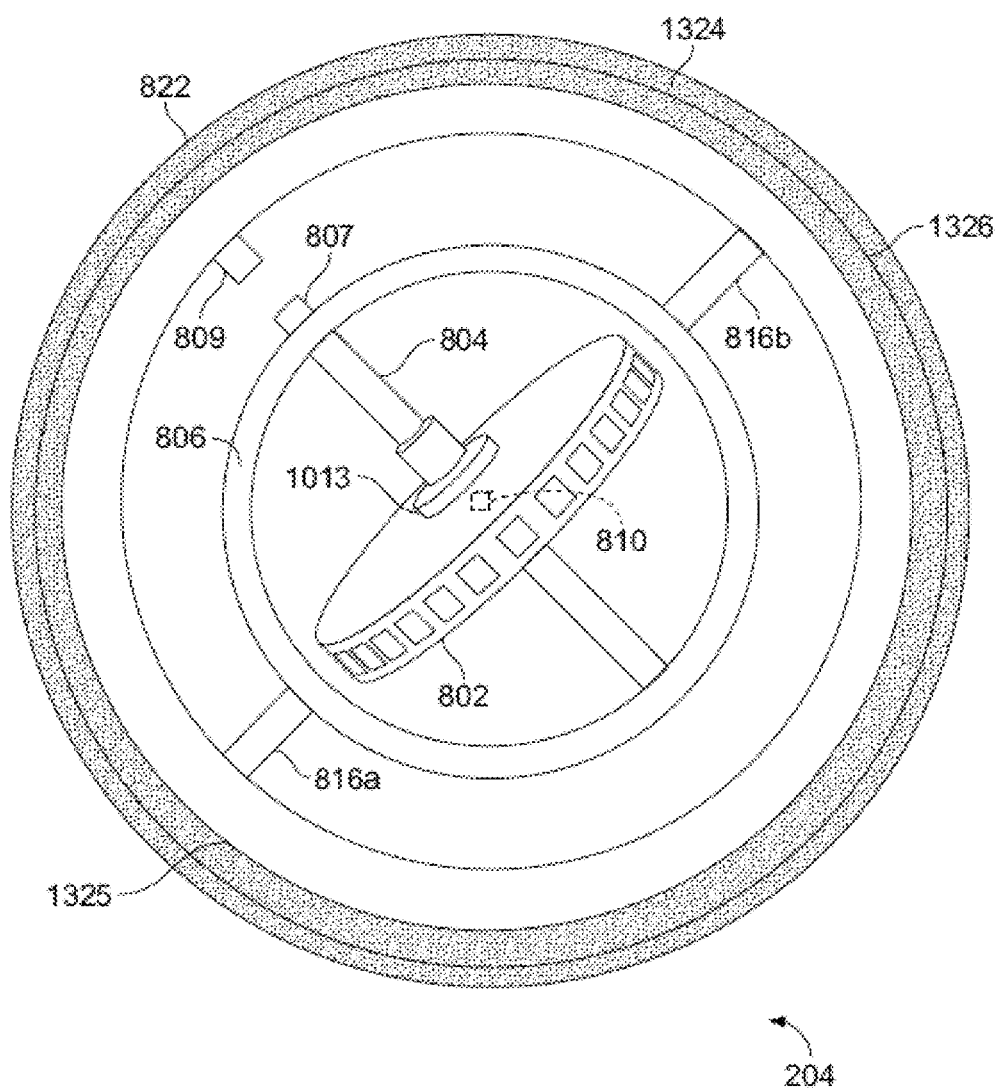
FIG. 13A illustrates a directional feedback device which can act as a user input device.
Figure 14A:
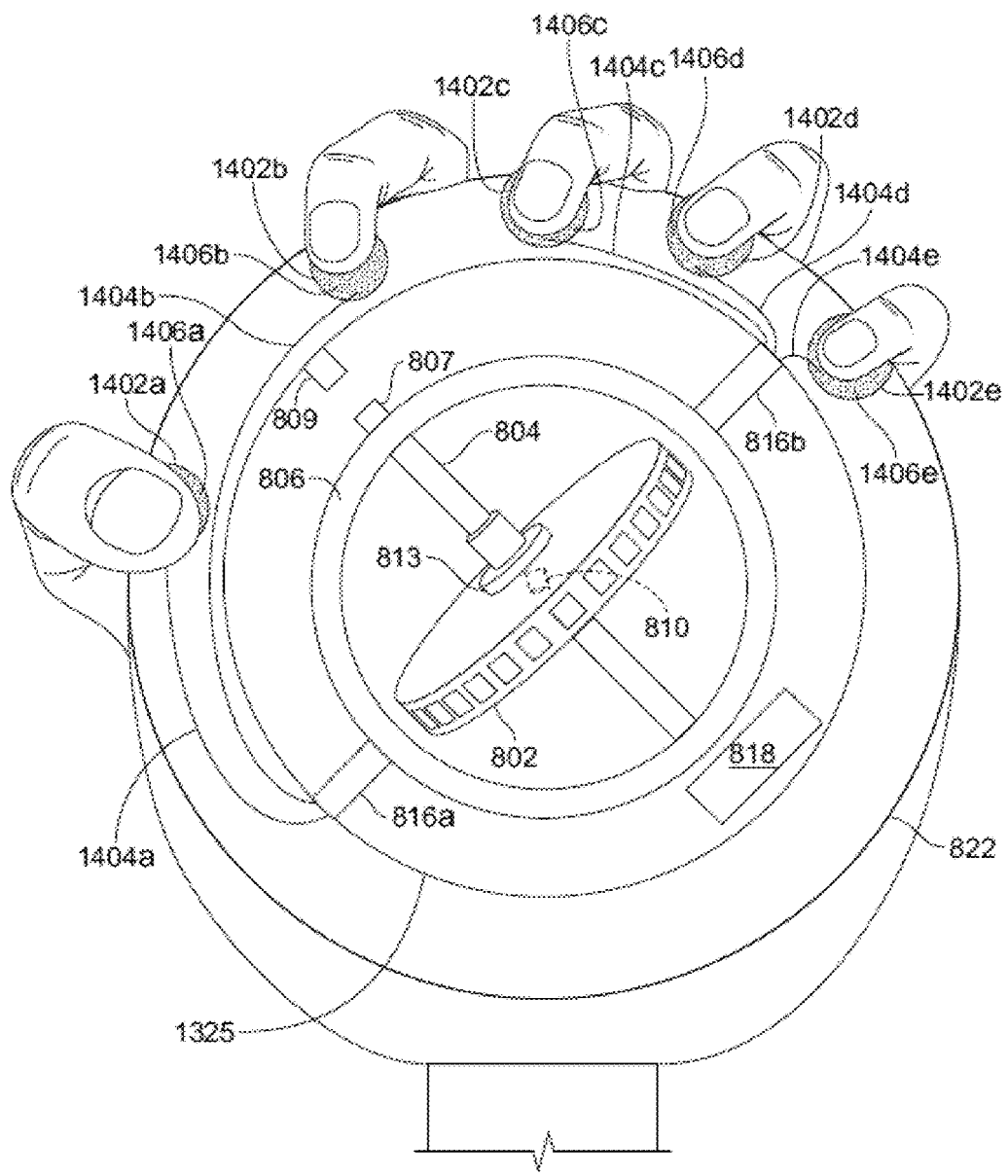
FIG. 14A illustrates another embodiment of a directional feedback device which can also serve as a user input device using at least one designated pressure point.

Additionally, the control system 810 can process one or more commands which a user can indicate by applying pressure to the feedback device (see FIGS. 13A and 14A). The control system can access a lookup table of commands 532 in memory 512 in one embodiment in order to corresponds signals received with specific commands. (see FIG. 15).

The control system is powered via a power bus 510 by a power supply 522. In one embodiment, the power supply is a battery. In one example, the battery is an inductively charged battery. This is convenient in that the directional feedback device can be placed in a wireless charger and charged. This allows for avoiding wire connections on the directional feedback device for charging further supporting self-contained versions of the device 204. Optionally, the force generation system 518 can draw power from the inductively charged power supply 522. In another embodiment, components of the force generation system 518 may have inductively charged power supplies located local to the components.

In the examples shown below, the feedback device embodiments have at least one accelerometer in a known location on the device. A home position reference point is also at a known location on a supporting structure such as a housing like spherical shell 822, and hence at a known relative position to the at least one accelerometer. In some embodiments, to simplify calculations, an accelerometer can be placed on the home position reference point.

Figure 6:
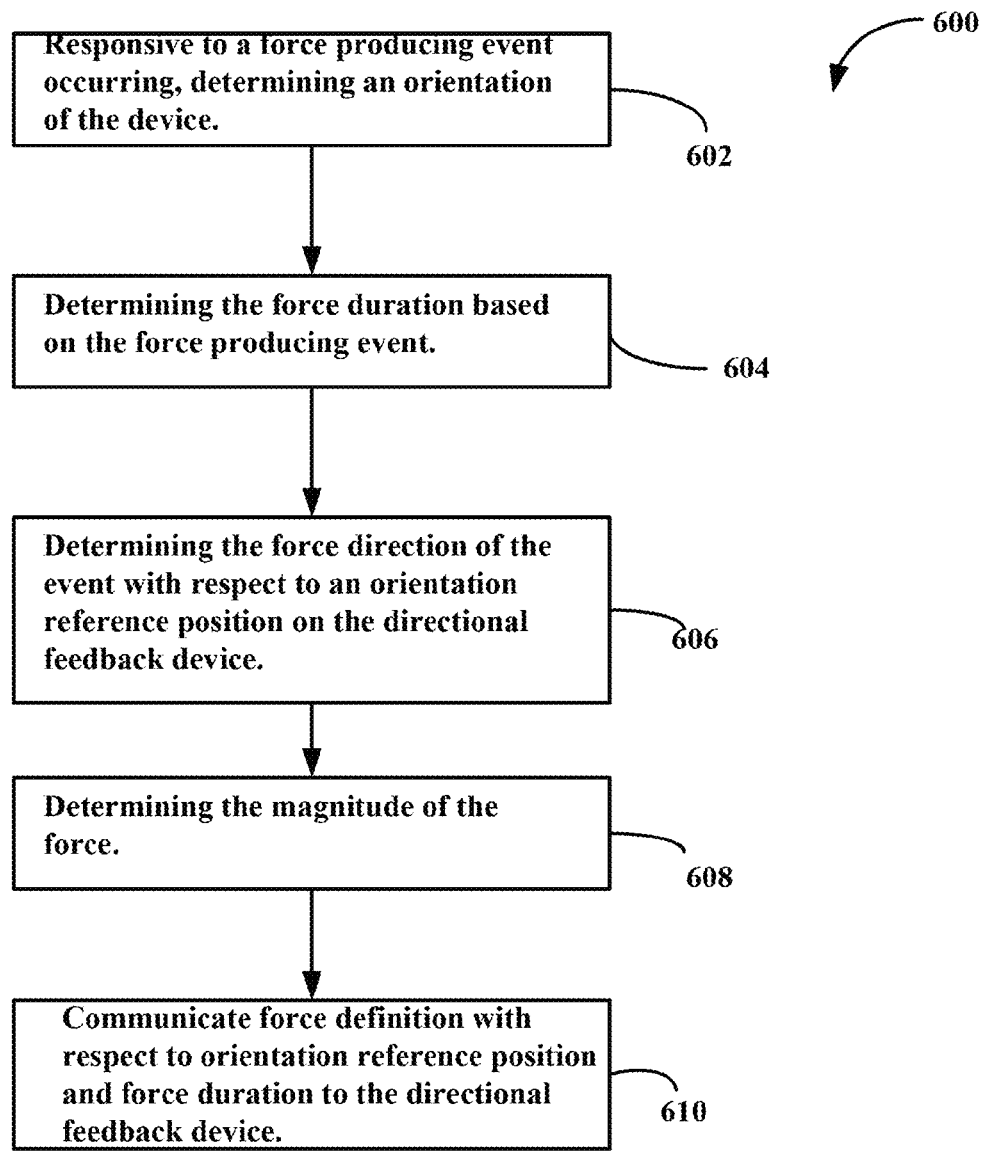
FIG. 6 is a flowchart of a method embodiment defining a force vector for a directional force feedback device.
Figure 7:
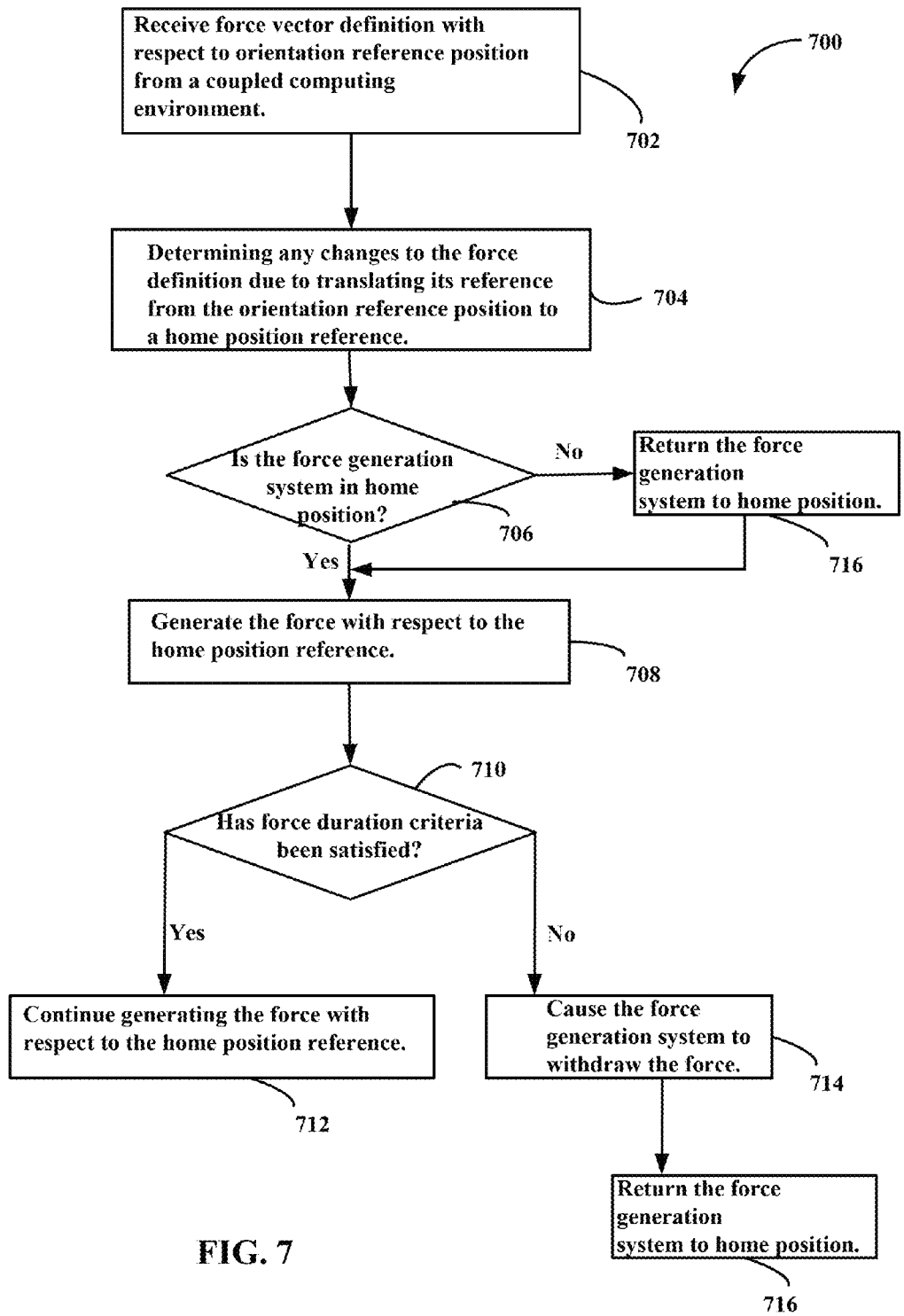
FIG. 7 is a flowchart of a method embodiment for generating a force with reference to a home position of the device.

FIG. 6 is a flowchart of a method embodiment 600 defining a force vector for a directional force feedback device. FIG. 7 is a flowchart of a method embodiment for generating a force with reference to a home position of the device. FIGS. 6 and 7 are discussed in the context of the computing environment of FIG. 4 and the control system 810 of the feedback device illustrated in FIGS. 5A and 5B for illustrative purposes only and not to be limiting thereof.

An application 315 executing on the processor 304 determines a force producing event has occurred. For example, user input from the feedback device 204 needs a response; or an instruction such as a navigational suggestion to move in a certain direction needs to be communicated to a user holding the device; or a contact has been made with a physical object attached to the feedback device held by the user. Responsive to a force producing event occurring, a force determination software module 323 associated with the application determines 602 an orientation of the feedback device, for example based on data from an accelerometer on the device. Based on the force producing event, the force determination module 323 determines 604 the force duration time period. The force determination module 323 determines 606 the force direction of the event with respect to an orientation reference position on the directional feedback device. In one example, this is the location of one or more 3-axis accelerometers on the feedback device. The module 323 can also determine 608 a magnitude of the force to be generated and communicates 610 the force definition with respect to the orientation reference position to the controller 508 of the directional feedback device 204. In the example of a contact with a physical object being the force producing event, an application 315 such as a gaming application can receive image data of the object, for example, and identify an angle at which it is hit. Depending on the degree of resolution, the additional orientation data from a sensor on the device can help identify motion of the physical object, for example, whether the edge of the blade of the sword 200 is horizontal or vertical or somewhere in between. The orientation data can also reflect motions such as spinning of the object in a person's hand to a finer resolution. In another example, a user may be holding the device 204 itself in his hand, and the application 315 needs to instruct the user to move to his left. The control system 508 needs to determine the relationship between the user's left and where torque vectors of the force generation system would be directed. Determining the orientation of the device and having an orientation reference position to start from helps a control system 810 for force generation enclosed within the feedback device 204 determine the direction in which a force vector should be pointing. Furthermore, the force generation system 518 of the feedback device 204 has an initial position or home position as a reference point from which to have a starting point or origin to define angles.

FIG. 7 is a flowchart of a method embodiment for generating a force with reference to a home position of the device. The controller 508 receives 702 a force vector definition from a force determination module 323 executing in a communicatively coupled computing environment, and it is defined with respect to an orientation reference position of the device. As mentioned above, the reference position can be the location of an orientation sensor such as an accelerometer on the device. The controller 508 can access from the memory 512 the position 528 of the accelerometer on the device 204 and the position 528 of the home position reference point on the device. The force processing software 524 executing on the controller 508 determines 704 any changes to the force vector definition due to translating its reference from the orientation reference position to a home position reference. In some cases where an accelerometer rests on the home position reference point, there may be little or no changes required in the force vector definition. The force processing software 524 determines 706 whether the feedback device is in home position. If not, the force processing software 824 causes instructions to be sent to the force generating system 518 to return 716 the force generation system 518 to home position.

If the device is already in home position, the force processing software 524 sends instructions to the force generation system 518 to generate 708 the force with respect to the home position. Responsive to force duration criteria being satisfied 710, the force processing software 524 causes 714 the force generation system 518 to withdraw the force and return 716 the device to home position. Otherwise, the force generation system 518 continues 712 generating the force with respect to the home position reference. The following examples illustrating various embodiments of force generation systems illustrate home position references.

Figure 8A:
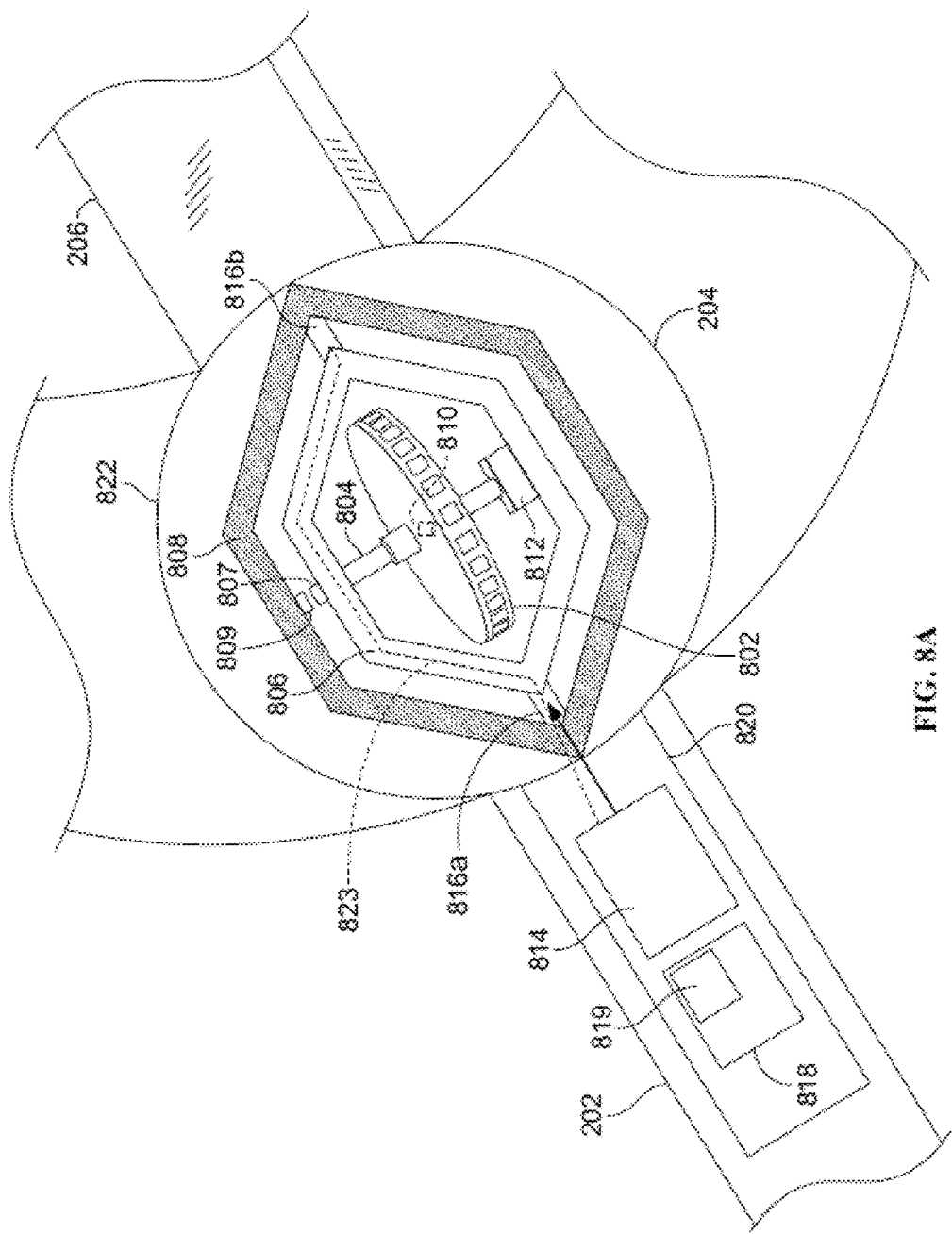
FIG. 8A illustrates an embodiment of a free space directional feedback device.

FIG. 8A illustrates an embodiment of a directional feedback device 204. It is illustrated in the context of the toy sword 200 for illustrative purposes only and not to be limiting thereof. In this embodiment, the device 204 has a handle portion 820 and a spherical shell portion 822. The shape of the shell or housing can be any desired shape.

The spherical shell 822 can be part of a support structure supporting a force generation system. The force generation system comprises the structures and elements providing power to move the structures to create a force in a designated direction. Attached to the spherical shell 822 is an outer support structure 808 attached fixed to the spherical shell and having at least one point of attachment 816a to an inner support structure 806. In this case, the outer support structure 808 has two attachment structures 816b and 816a on opposite sides of the inner support structure. Within the inner support structure 806, is an axial structure 804, in this case a shaft or rod, about which a mass, in this example a disk 802, rotates. In this example, the magnitude of a force vector is that of a torque created by controlling the speed of a spinning mass about the axial structure 804. Via the attachment structures 816a and 816b, motor 814 provides power at least to structure 816a to rotate the inner support structure 806 along an axis that is perpendicular to the axial structure 804. For example, such an axis can be an imaginary line extending from 816a to 816b. The rotation of the inner support structure 806 of the force generation system directs the torque generated out of one of the ends of the axial structure 804 to any angle in the circle of rotation.

In this example, a motor 812 provides the power to spin the disk 802 about the axial structure 804 thus producing a torque. Disk 802 is balanced in weight about the structure 804. By rotating the inner support structure 806 relative to the outer support and the spherical shell 822, the torque generated in alignment with one end or the other of the axial structure can be directed in any of 360 degrees of a circle centered the disk center and about an axis passing between 816a and 816b.

In this embodiment, rotation of the inner support structure 806 is referenced to a home position. Different design choices can select a different home position. In the example of FIG. 8A, the device 204 is in home position when the inner support structure 806 is aligned substantially or entirely in the same plane as the outer support structure 808. Based on this definition, the device in FIG. 8A is shown in its home position. If the inner support structure 806 were rotated into the page, the device 204 would not be in home position, and a force would be felt coming from the page out of the axial structure's bottom end when the disk is spinning clockwise. Home position is with respect to the directional feedback device's orientation system enclosed within the housing 822, not any physical object which may be attached to the feedback device. Their orientation systems are independent. Translation between them, however, can be done with respect to reference points.

The inner support structure 806 can have a sensor 807 located on its top outer surface that sends data indicating it is aligned with a home position reference point 809 on the inner side of the outer support structure 808 which is fixed.

At least one sensor, which in the examples of FIGS. 8A, 8B, 10A, 10B comprises a three-axis accelerometer 818, is located on the handle portion 820. For a physical object such as a sword, bat, racket, etc. that is hand held, this placement is close to the user's hand and relatively stationary with respect to the user's hand. An accelerometer can provide orientation data such as pitch and yaw of the physical object which can be used to determine motion characteristics for the physical object. Using the motion characteristics, the one or more processing modules can determine the direction and magnitude of the physical force vector to be directed on the physical object. The accelerometer 818 can wirelessly 819 transmit electrical signals to the controller 508 for transmission to a coupled computing environment or the controller 508 for subsequent transmission.

In this embodiment, electronic control circuitry 810 is housed within the disk. For example, it may be implemented as a system on a chip (SoC) including the inductively charged power supply 522. In this example, insulated conductors 823 (e.g. one or more insulated wires) extend from the circuitry 810 through the axial structure 804 to the motor 812 for the disk and via the inner support structure 806 and attachment structures 816a to the motor 814 for rotating the inner structure 806. Motor 814 can direct power via the insulated conductors 823 to attachment structure 816b in one example. Via the insulated conductors 823, the controller 508 can send the control signals indicating the direction of rotation and the degree of rotation to motor 814 and the determined rate of spin of the disk to the motor 812.

FIG. 8B illustrates another embodiment of a directional feedback device 204. In this embodiment, the motor 814 in the handle portion 820 is replaced by one or more small motors in at least one of the attachment structures 816a and 816b. Furthermore, in this example, the spherical shell acts as the outer support structure and the attachment structures 816a and 816b are attached to the spherical shell. To determine home position, the inner support structure 806 can still have a sensor 807 located on its top outer surface that sends data indicating it is aligned with a reference point 809 except that the reference point 809 is on the interior of the spherical shell.

FIG. 9A illustrates a pancake motor system 832a housed in one of the attachment structures of FIG. 8B, in this case 816a and FIG. 9B illustrates another pancake motor system 832b housed in attachment structure 816b. The motors and attachments structures are discussed together as they are similarly structured and operate in a similar manner in this embodiment. A connector 830a, 830b for a motor drive shaft 834a, 834b in this embodiment extends from the support structure 806. The support structure can be plastic, and the connector can be molded as a protrusion into the attachment structure 816a, 816b. In this embodiment, a pancake motor system 832a works in conjunction with a pancake motor system 832b at the other attachment support 816b to rotate the support structure 806 a desired angle to direct the axial structure 804 to a desired position. The drive shaft 834a, 834b of the pancake motor 832a, 832b fits the connector 830a, 830b to rotate 806. The pancake motor system 832a, 832b includes an inductively charged battery 833a, 833b for providing the motor currents driving the shaft.

The pancake motor system 832a, 832b can receive control driver signals from the electronic circuitry 810 in the disk via the insulated conductor 823 as shown in FIG. 8A. However, in this embodiment, the pancake motor systems 832a, 832b each include a wireless communication device 835a, 835b for receiving control signals from the electronic circuitry 810 in the disk.

Figure 10A:
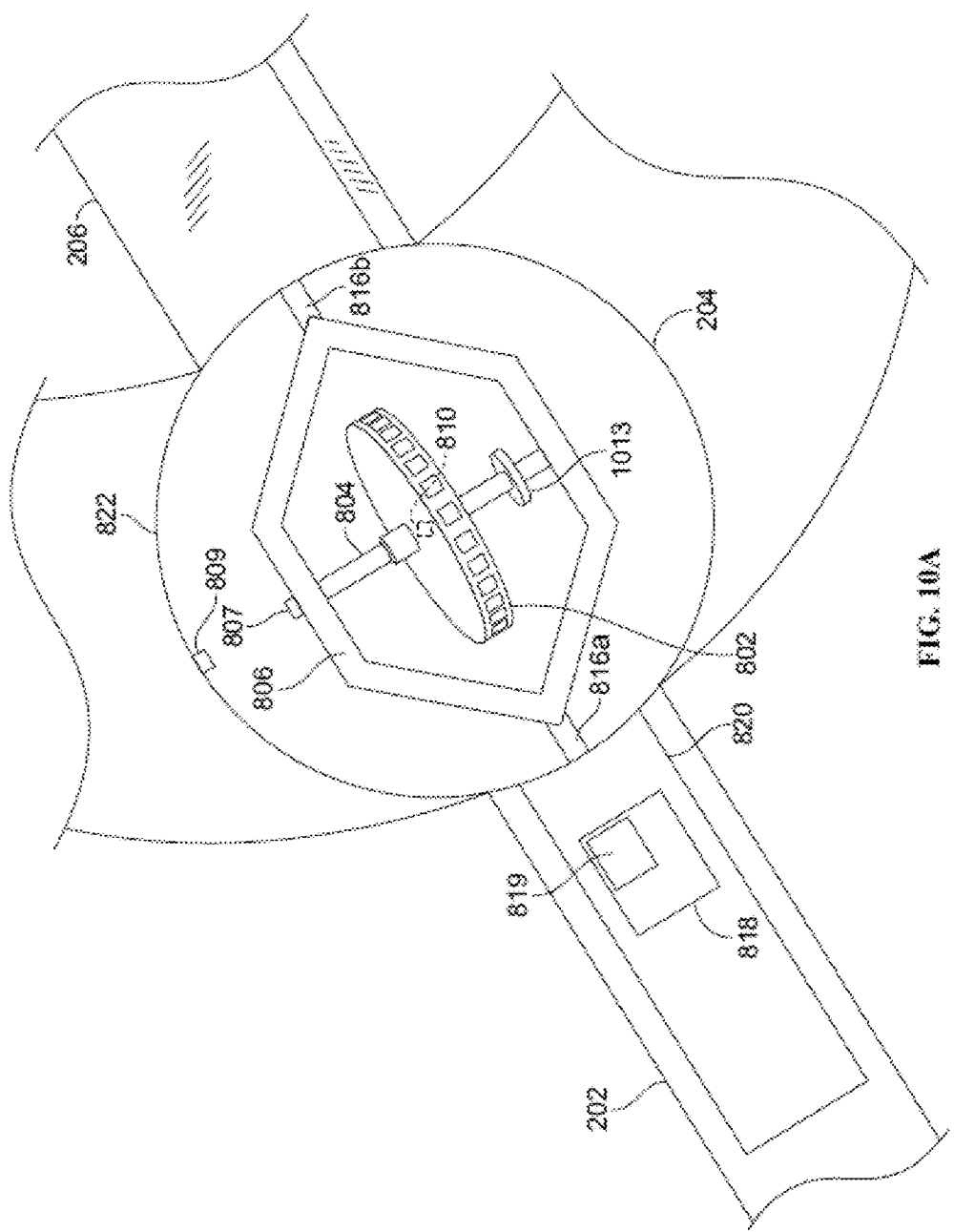
FIG. 10A illustrates another embodiment of a directional feedback device in which magnets in an arrangement based on a brushless DC motor rotate the mass about the axial structure.
Figure 10B:
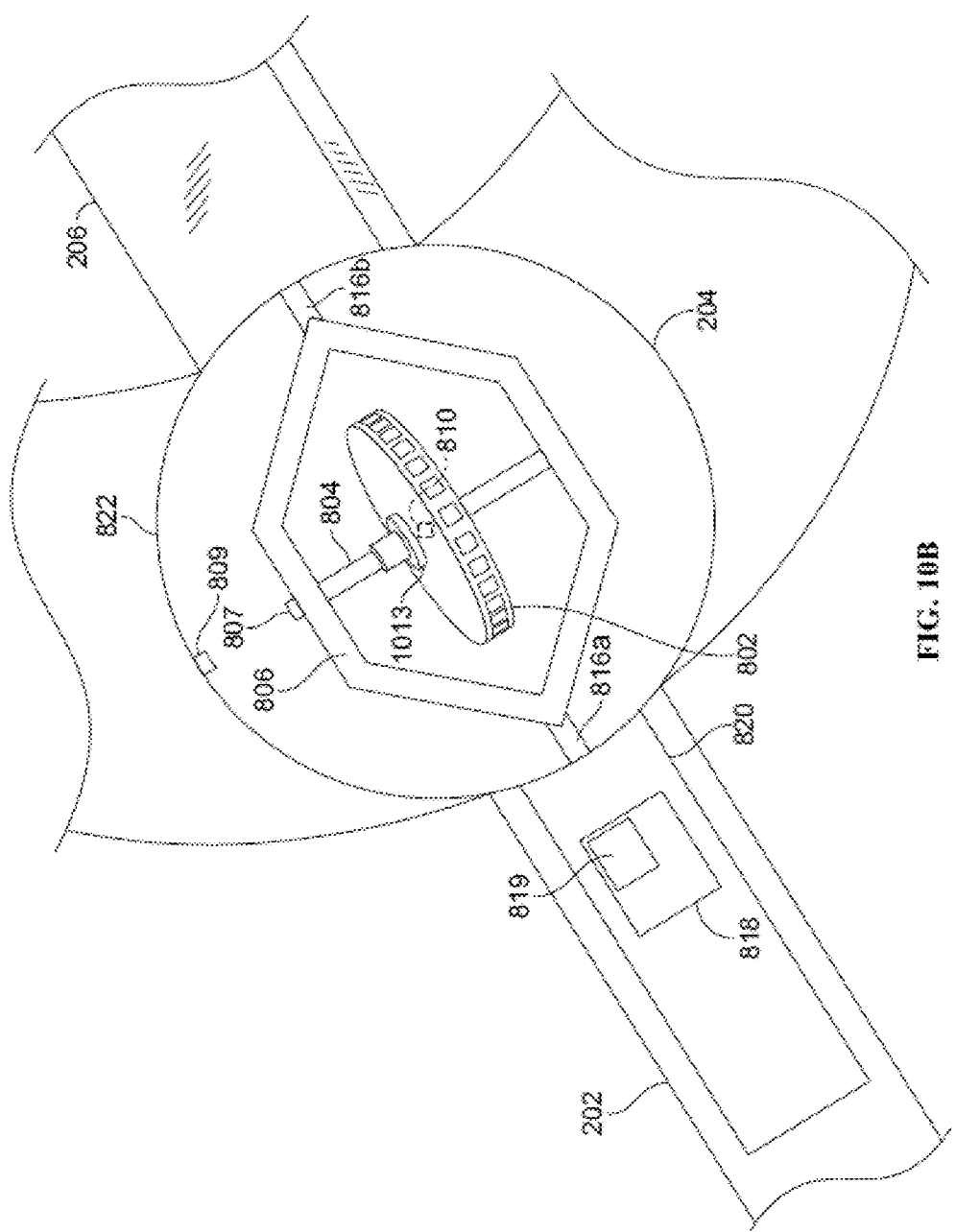
FIG. 10B illustrates another embodiment of a directional feedback device in a different arrangement of the magnets for rotation of the mass about the axial structure.

FIG. 10A illustrates another embodiment of a directional feedback device 204 in which magnets in an arrangement based on a brushless direct current (DC) motor rotate the mass 802 about the axial structure 804. FIG. 10B illustrates another embodiment of a directional feedback device in a different arrangement of the magnets for rotation of the mass about the axial structure 804.

FIG. 10A illustrates another embodiment of a directional feedback device 204. In this embodiment, the motor 812 for rotating disk 802 is replaced with at least one permanent magnet 1013 in a support beneath the disk 802. Electromagnets are located along the attachment supports 816a and 816b. (See FIGS. 11A and 11B below). FIG. 10B illustrates another embodiment of a directional feedback device 204 in which the at least one permanent magnet 1013 is located on the disk itself.

FIG. 11A illustrates an electromagnet 1014a housed in one of the attachment structures of FIGS. 10A and 10B. FIG. 11B illustrates an electromagnet 1014b housed in the other attachment structure of FIGS. 10A and 10B. They are discussed together as they are similarly structured and operating in this embodiment. Electromagnets 1014a and 1014b are fixed to their locations. They change their polarity when the current running through them reverses. The center magnet 1013 is a permanent magnet in this example, and it rotates about its center.

The connector 830a, 830b for the motor drive shaft 834a, 834b is a support for an electromagnet comprising a metal layer 1042a, 1042b encompassed by an insulated conductor 1044a, 1044b. For example, an insulated wire can be wrapped around a sheath of metal. Electronic control circuitry 1040a, 1040b is connected to the insulated conductors 1044a, 1044b to monitor timing and reverse the current polarity at the appropriate time. The magnet electronic control circuitry 1040a, 1040b can include an inductively charged battery. The magnet electronic control circuitry 1040a, 1040b can receive control driver signals from the electronic circuitry 810 in the disk via the insulated conductor 823 as shown in FIG. 8A. However, in this embodiment, the magnet electronic control circuitry 1040a, 1040b each include a wireless communication device 1045a, 1045b for receiving control signals from the electronic circuitry 810 in the disk. The electromagnets 1014a, 1014b and the pancake motors 832a, 832b can also share a wireless communication device and inductively charged battery.

Figure 12A:
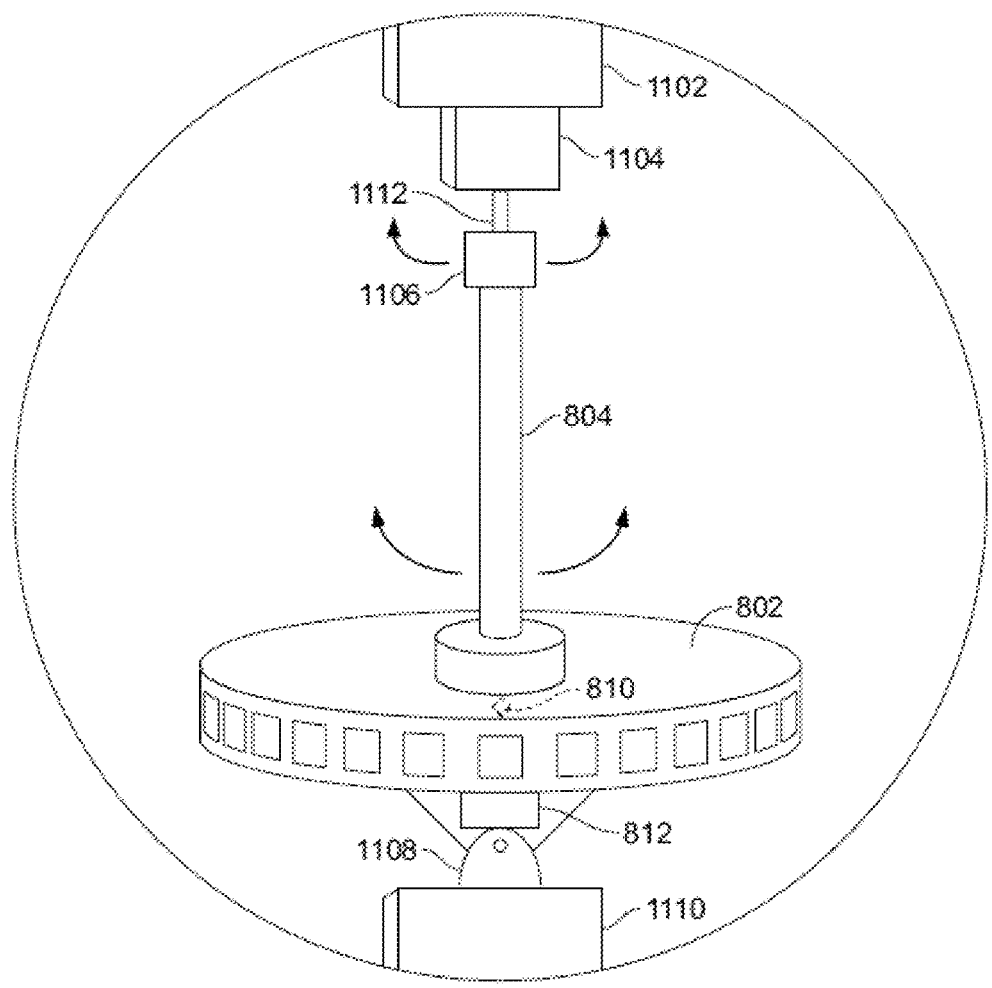
FIG. 12A illustrates yet another embodiment of a directional feedback device.

FIG. 12A illustrates yet another embodiment of a directional feedback device 204. In this embodiment, the force generation system comprises an axial structure 804, about which a mass, a disk 802, spins powered by a motor 812. However, instead of rotating a support structure, a servo motor 1104 is attached to a motor support 1102 which can be attached to or part of the support structure for the device, such as the interior of the spherical shell housing 822. The shaft 1112 of the servo motor 1104 changes its angular position responsive to changes in a control signal from the controller 508. The servo motor 1104 can include a wireless communication device within its control circuitry as well. Servo motors tend to be small, lightweight, and come with control circuitry built in. The shaft 1112 moves one end of a deflector arm 1106 as the shaft changes angular position. The deflector arm 1106 is connected at its other end to the axial structure 804. This end tilts the axial structure 804 and its centered disk 802 due to an angular position change of the shaft 1112. The tilt of the axial structure 804 is confined by a hinge 1108 which also has a support 1110 which can be attached or part of the support structure 822 for the directional feedback device 204. FIG. 12A illustrates the device in its home position in which the deflector arm 1106 is perpendicular to the axial structure 804.

Figure 12B:
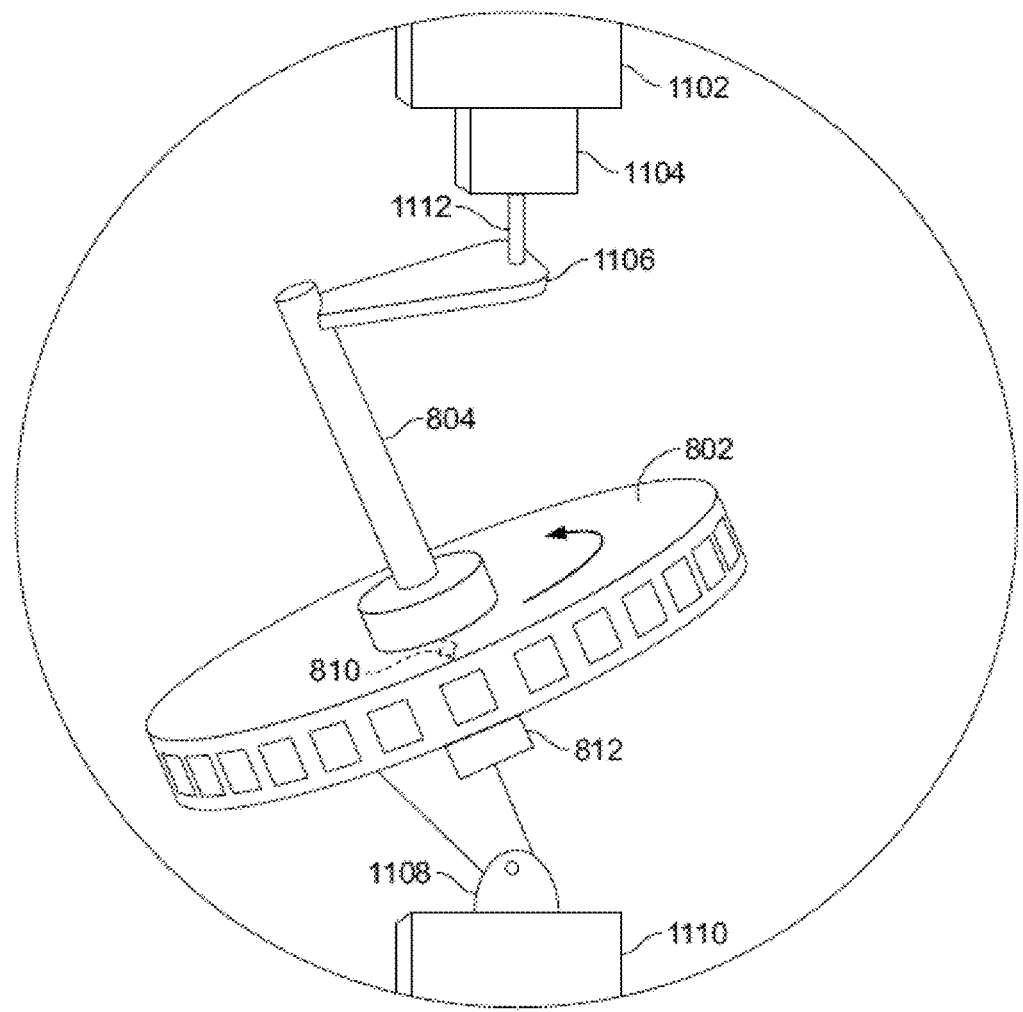
FIG. 12B illustrates the embodiment of FIG. 12A in other than a home position.

FIG. 12B illustrates the embodiment of FIG. 12A in other than a home position. The motor shaft 1112 rotates or changes its angle in one direction causing one end of the deflector arm 1106 to follow its angular path resulting in the other end of the arm 1106 tilting the axial structure 804 in the opposite direction to a desired position and to the extent allowed by hinge 1108. In some instances, the tilting of the axial structure 804 can be performed in a quick burst.

FIG. 13A illustrates a directional feedback device 204 which can act as a user input device. The spherical shell housing 822 acts as an outer shell and encloses an inner shell 1325. Between the shells is conductive gel 1324. The conductivity of the gel is affected by the user's pressure on the device 204. Some examples of conductive gels are silver chloride based gels and silicone gels. One example of a silicone gel has conductive particles comprising silver coated mica and oxide free silver flakes. In one embodiment, resistance changes occur in the conductive gel when pressure such as from a hand or finger is applied. These resistance changes can serve as signals for commands from a user. A conductor such as wire 1326 indicates the resistance change via a voltage or current change as voltage (V) equals current (I) multiplied by resistance (R), $V=IR$.

Figure 13B:
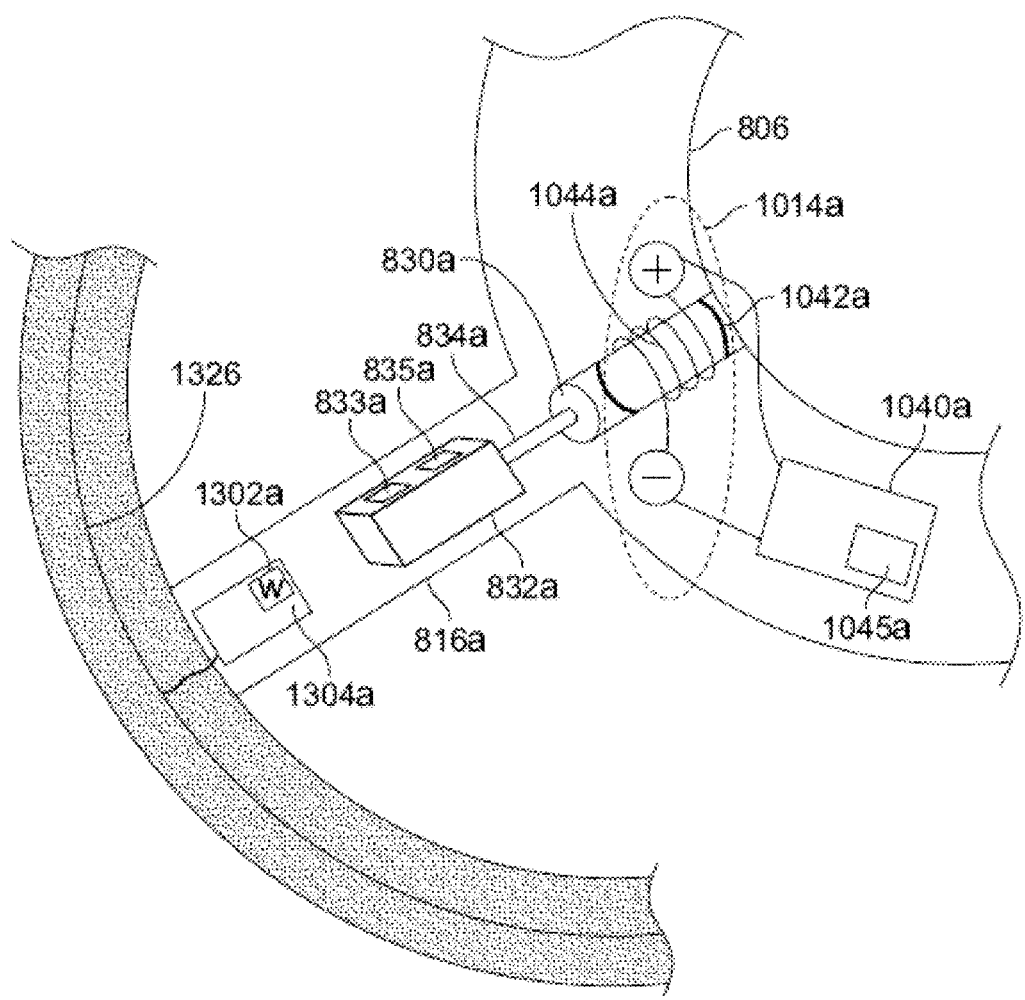
FIG. 13B illustrates an example configuration for sensing changes in conductive gel.

FIG. 13B illustrates an example configuration for sensing changes in the conductivity of the conductive gel. The wire 1326 connects to a sensor system 1304a which can provide a reference voltage or current to create a circuit in the conductive gel. The sensor detects the current voltage or current, e.g. perhaps periodically, and can wirelessly transmit via wireless communication device 1302a the value to the wireless device 502 for command processing by the controller 508. Commands can be represented by the amount of pressure applied and the length of time the pressure is applied.

FIG. 14A illustrates another embodiment of a directional feedback device which can also serve as a user input device using at least one designated pressure point. In this example, there are five designated pressure points implemented as five indentations 1402a-1402e in the sphere convenient for placing the fingers of a hand. As illustrated, the feedback device is of a size capable of being hand held. Each designated pressure point indentation has an enclosed amount 1406a-1406e of conductive gel surrounding it on the side between the outer 822 and inner 1325 shells. A wire 1404a-1404e from each enclosed amount of gel for a respective indentation links its respective indentation to a sensor system 1304a, 1304b in one of the attachment supports 816a or 816b. In this way, the number of commands a user can indicate is greatly increased due to the five pressure points and various combinations they allow.

Figure 14B:
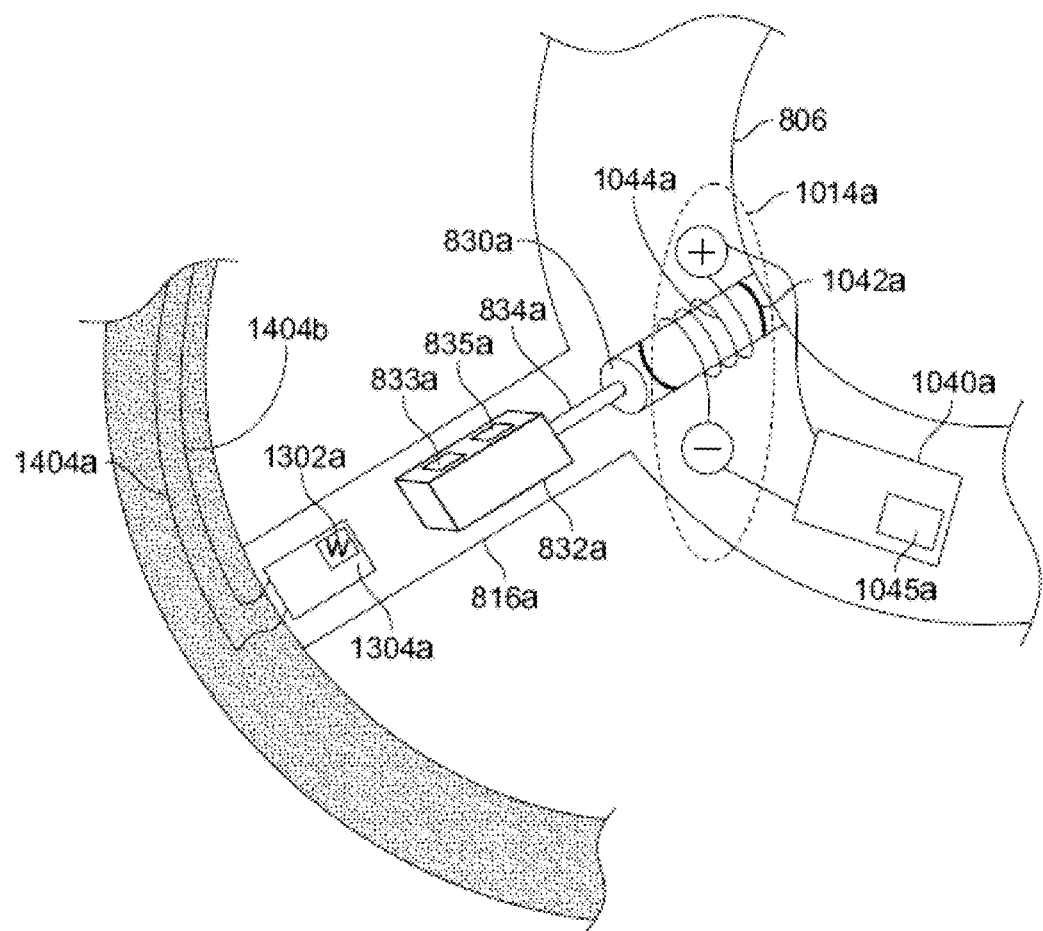

FIGS. 14B and 14C illustrate another example configuration for sensing changes in the conductive gel with the five designated pressure points of FIG. 14A. In this example, a wire 1404a-1404b from each of the enclosed amounts 1406a-b about the indentations 1402a and 1402b for the thumb and index finger indentations are coupled to sensor system 1304a, and a wire 1404c-1404e from each of the enclosed amounts 1406c-e about the indentations 1402c, 1402d and 1402e for the middle, ring and little finger indentations are coupled to sensor system 1304b. All five wires could have been coupled to one sensor system if desired.

Commands will typically be defined for the application context. For example, commands can include scroll, open, close, save, exit, click, etc. in a graphical user interface application or environment such as Windows®. In another example, a user may be navigating through an animated reality of a game, or a three-dimensional display context and may wish to move his avatar or his view down a certain path. Commands may be items such as left, right, forward, backward. An accelerometer 818 on the directional feedback device 204 can indicate how fast the user desires to do so by sensing and forwarding data indicating how fast the user is turning the device 204 in his or her hand. Additionally, the accelerometer 818 can provide data representing motion characteristics such as the position of the directional feedback device 204 and its direction of movement. The controller 508 or a processor 304 of the coupled computing environment (e.g. 52) can use this information to determine in which direction the user wants to go.

Figure 15:
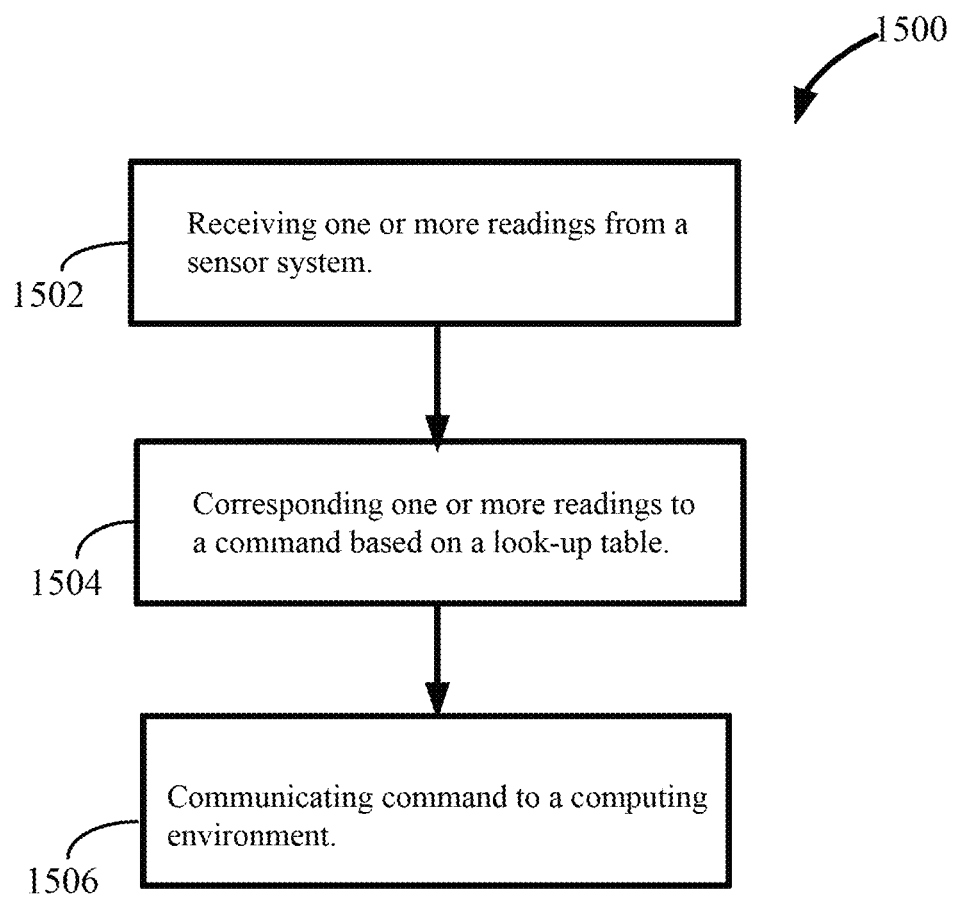
FIG. 15 illustrates a flow chart for an embodiment of a method for processing user input from a free space directional feedback device.

FIG. 15 illustrates a flow chart for an embodiment of a method 1500 for processing user input from a free space directional feedback device. The controller 508 receives 1502 one or more readings from a sensor system and determines 1504 if the one or more readings correspond to a command, and if so, communicates 1506 the command to a computing environment (e.g. 300). The controller 508 in one example, accesses a look-up table of stored values in memory 512 and does a comparison. There may be one or more lookup tables, (e.g. commands 532) relating signals to the fingers and then combinations of finger presses to specific commands. The controller 508 can also monitor the time period a pressure has been applied in determining commands. In other embodiments, the readings can be transmitted directly to a coupled computing environment for processing.

Similarly, the directional feedback device 204 can generate a force vector pointing in a certain direction to indicate to a user a suggested or commanded direction of movement as indicated by an application executing in a wirelessly communicatively coupled computing environment. In one embodiment, the controller 508 can process such navigational commands as any other force vector.

FIG. 16 illustrates an example embodiment of a configuration of a target, recognition, analysis and tracking system 50 with a user 58 playing a sword fighting game software application executing in a computing environment 52. In an embodiment the system includes an image capture system 60, for example, a camera, that may be used to visually monitor one or more users, such as the user 58, such that movements performed by the one or more users may be captured, analyzed, and tracked. The movements of the user 58 may be interpreted as controls that may be used to affect the application being executed by computer environment 52.

In one embodiment, based on the captured image data, the system recognizes and tracks the user's natural movements in three dimensional space. Using the system, a user's actions can directly control actions of an associated avatar on a display such as sword fighter avatar 64. In other words, the avatar 64 can mimic actions of the user 58 in real-time.

The tracking of user motions to the display of the avatar is preferably performed in real time such that the user may interact with an executing application in real time. A real-time display refers to the display of a visual representation of a user's motion or pose, wherein the display is simultaneously or almost simultaneously displayed with the performance of the motion or pose in physical space. For example, an update rate of a display that echoes a user may be 20 Hz or higher, wherein insignificant processing delays result in minimal delay of the display or are not visible at all to the user. Thus, real-time includes any insignificant delays pertaining to the timeliness of data which has been delayed by the time required for automatic data processing.

In other example embodiments, the human target such as the user 58 may have a physical object such as a toy gun, bat, racket, sword, etc. In such embodiments, the user of an electronic game may be holding and using the object while participating in the game. The motions of the object are tracked and mapped onscreen so that the avatar is depicted with a virtual object representing the object that the user is manipulating. The virtual object tracks the motions of the physical object as it is being moved by the user in free space. For example, the motion of a how the user 58 strikes with his sword 200 is tracked and utilized for controlling how his on-screen avatar 64 strikes with his animated sword 63.

In one embodiment, the target recognition, analysis and tracking system 50 may only track the movements of the physical object 200 that the user 58 is holding. Additionally, movements of the physical object or user may be limited to representation from a certain set of motions or poses. In other words, certain motions or poses trigger action in a game, but not all natural movements are tracked to the user's avatar.

The target recognition, analysis and tracking system 50 may include a computing environment 52. The computing environment 52 may be a computer, a gaming system or console, or the like. According to an example embodiment, the computing environment 52 may include hardware components and/or software components such that the computing environment 52 may be used to execute applications such as gaming applications, non-gaming applications, or the like.

According to one embodiment, the target recognition, analysis and tracking system 50 may be connected to an audiovisual device 56 such as a television, a monitor, a high-definition television (HDTV), or the like that may provide game or application visuals and/or audio to a user 58. For example, the computing environment 52 may include a video adapter such as a graphics card and/or an audio adapter such as a sound card that may provide audiovisual signals associated with the game application, non-game application, or the like. The audiovisual device 56 may receive the audiovisual signals from the computing environment 52 and may then output the game or application visuals and/or audio associated with the audiovisual signals to the user 58. According to one embodiment, the audiovisual device 56 may be connected to the computing environment 52 via, for example, an S-Video cable, a coaxial cable, an HDMI cable, a DVI cable, a VGA cable, or the like.

Figure 17:
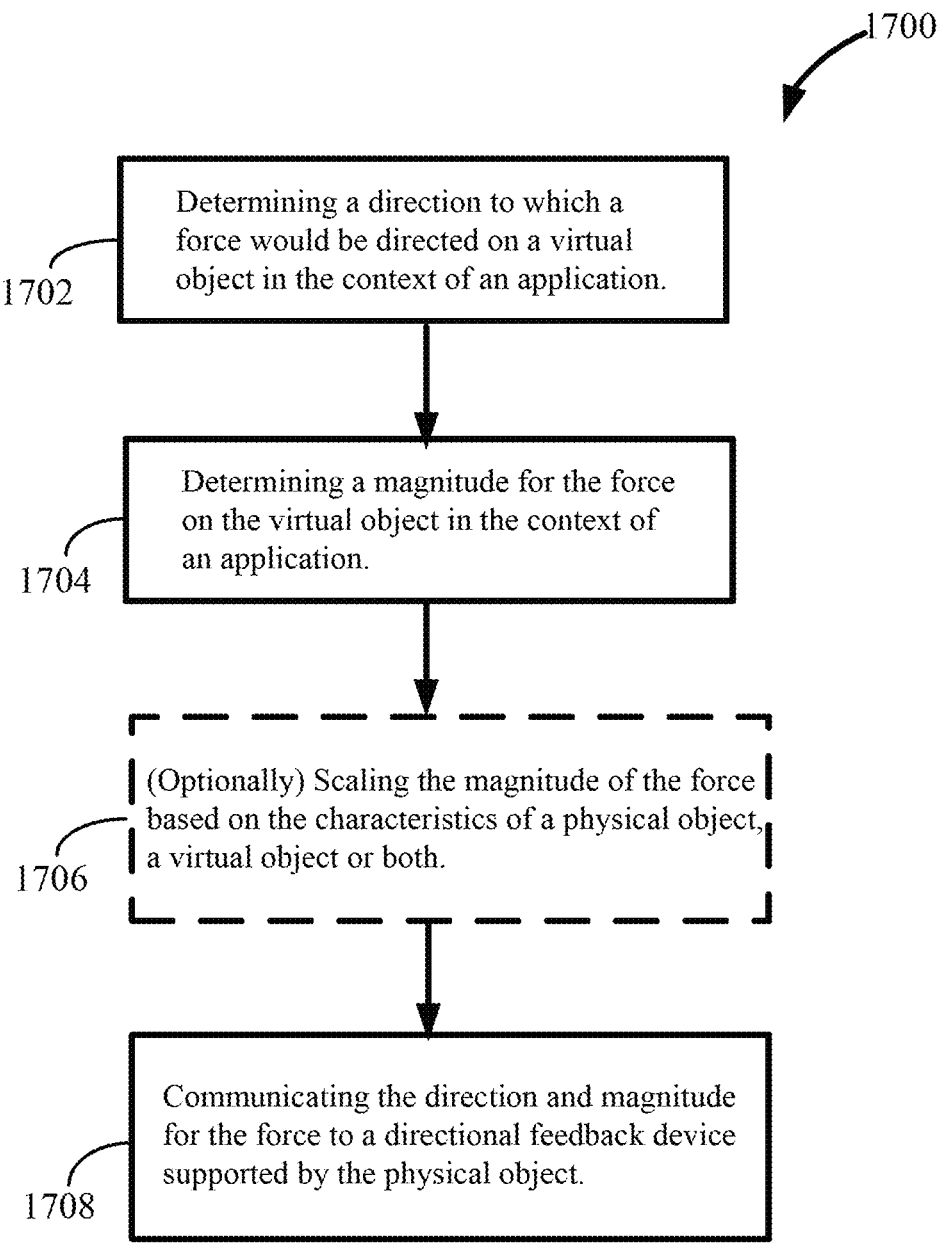
FIG. 17 is a flow chart of an embodiment of a method for providing sensory directional feedback in free space that can operate in a target recognition, analysis, and tracking system.

FIG. 17 is a flow chart of an embodiment of a method for providing directional force feedback in free space that can operate in a target recognition, analysis, and tracking system. The method can be implemented as one or more processing modules which can operate by software executing on one or more processors and/or computer hardware or as hardware or firmware. For example, in the computing environments of the game console 52 of FIG. 18A, the personal computer environment of FIG. 18B or the networked computing environment of FIG. 18C, it can be implemented as software stored and executed as an application program.

In one embodiment, the application interacting with other hardware and software components in its computing environment monitors motion of the user and her physical object as well as the motion of the avatars and their animated objects in the context of the game. In a sword game, for instance, it monitors contacts between the swords or other physical objects within the virtual environment of game. In this way, the one or more force determination software processing modules 323 determine when a force producing event with respect to a virtual object in the context of the game has occurred based on motion characteristics for the physical object under the control of a player. Some examples of motion characteristics for the object include position, angle, speed, direction of movement, acceleration, time period of a motion, and a volume of space around the user's body in which the physical object moves. Using the motion tracking system described above and in the co-pending patent applications incorporated herein, the above characteristics allow the system to control game play by the user with respect to the game environment.

Motion characteristics such as orientation data can also be used to supplement image data of the object. For example, in the sword game example, a target recognition, analysis and tracking system can determine the position and speed of the object while the accelerometer data provides supplemental motion characteristics information such as orientation data.

In one embodiment, an application directs 315 that a force be applied to the directional feedback device in the direction of a force vector on a corresponding virtual object. A force vector is commonly defined in terms of a direction and a magnitude. In the embodiment of FIG. 17, the force determination module 323 determines 1702 a direction to which a force would be directed on a virtual object in the context of an executing application such as a game.

The force can be generated from receiving a contact initiated by another virtual object or it can be a reaction force generated when the user has initiated a contact with her virtual object. For example, in the sword fight of FIG. 16, the avatar corresponding to the user holds a virtual object, a sword 63, the movements of which correspond to those of the physical object, the toy sword 200 held by user 58. In the sword game application, for example, when the other avatar's sword 65 strikes the sword 63 of the user's avatar, force determination software 323 executing on the game console 52 identifies at what angle the sword of the opponent avatar hits the user's virtual sword.

Determining a force vector can comprise determining a composite or resultant force vector. For example, in the sword game example, each virtual sword can strike from different directions, and the avatars can have the swords locked as they struggle against each other. The opposing swords have opposing forces which effects the direction and magnitude the user would feel or sense with his physical object. In one embodiment, the force vector represents the resultant force vector of at least two virtual force vectors generated on the virtual object in the context of the application executing in the computing environment.

At 1704, a determination is made with respect to the magnitude for the force on the virtual object in the context of an application. The more powerful a sword blow for example, the stronger the force (or reaction force) should be felt by the user.

In one or more embodiments, the magnitude of the physical force vector can be set proportional to a virtual object's force in the context of the executing application, the physical characteristics of the physical object or both. In one example, a user is playing with a toy sword, and the sword is made of lightweight plastic. Some examples of physical characteristics include weight, size and material. The swords in the game may be represented as heavy steel swords. The magnitude of the force to be felt by the user holding the sword may be scaled or adjusted to be similar to that of another like plastic sword as a steel sword would crush a plastic sword. In another context, where a user is using a regular tennis racket similar to one used in actual play, the force determination module 323 can more accurately represent the force that the avatar opponent and his or her virtual racket would generate.

In another example, a force magnitude can be scaled to one of a range of magnitude values that the directional feedback device is capable of producing. For example, in the sword game, user 58 gets a relative sense of how strong a blade strike or blow is depending on the magnitude of force generated.

Therefore, optionally, the magnitude of the force can be made variable by scaling 1706 the magnitude of the force based on the characteristics of the physical object, the virtual object or both.

The software causes communicating 1708 of the direction and magnitude for the force, the force vector, to the directional feedback device 204 supported by the physical object 200. The directional feedback device generates a physical force vector based on the definition to create game feedback in the device 204 which the user can feel. The software can communicate with an operating system that the data representing the direction and magnitude is to be sent by a wireless adapter (e.g. 333) so that the data can be transmitted wirelessly to the directional feedback device. Furthermore, the force determination module 323 can also communicate a change in the physical force vector to the free space directional feedback device. An example of such a change to be indicated is that the force no longer applies. For example, the opponent avatar's sword 65 has lifted from the user's virtual sword 63. Other changes may be changes in a component vector making up the composite force vector. For example, changes in angles of the blades with respect to each other when the swords remain in contact such as when the avatars are each applying a virtual force to their respective swords locked in a contact.

Some embodiments of computing environments for a target recognition, analysis and tracking system which communicates with an embodiment of the directional feedback device 204 are described.

Figure 18A:
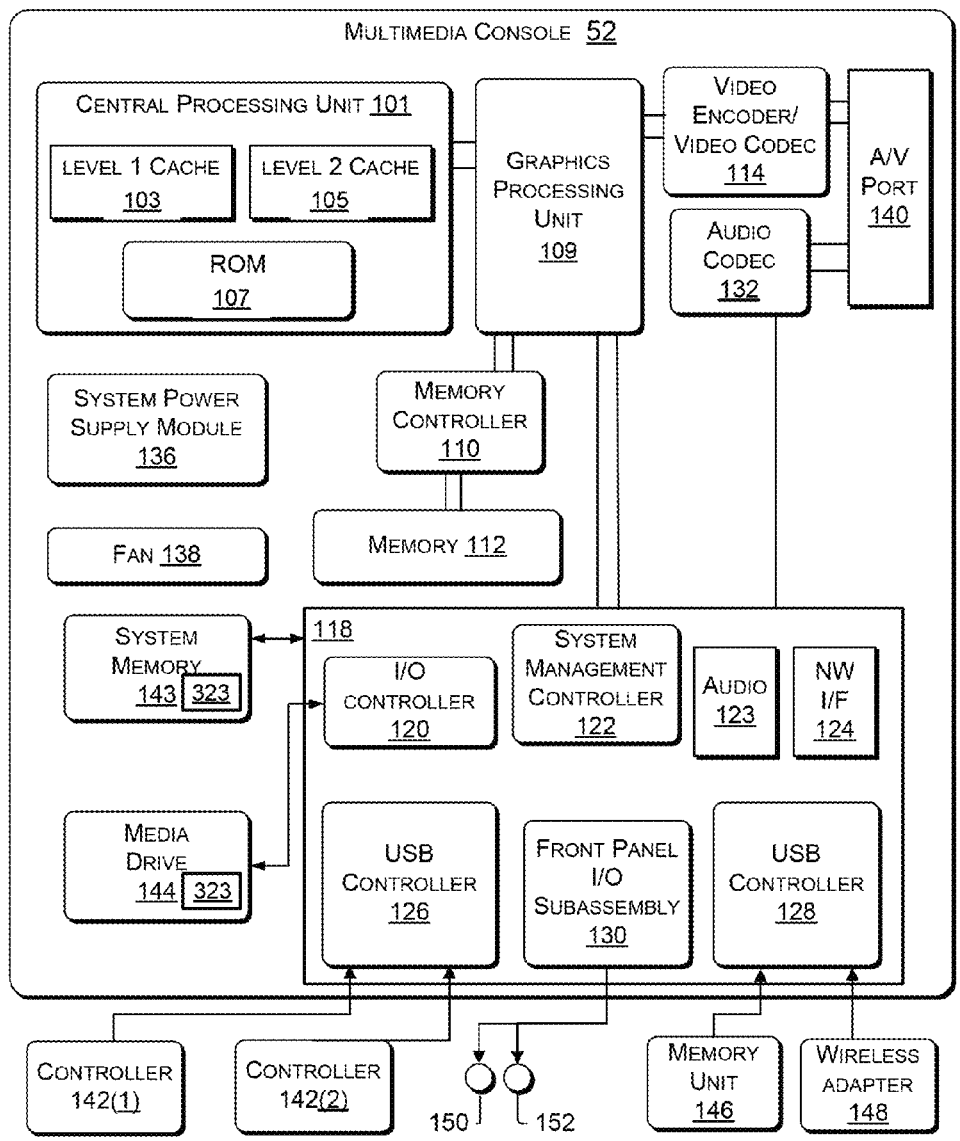
FIG. 18A illustrates a detailed example of an embodiment of a computing environment that may be used in a gaming console like that in FIG. 16 in which one or more embodiments for providing directional feedback in free space can operate.

FIG. 18A illustrates a detailed example of an embodiment of a computing environment 52 that may be used in a gaming console like that in FIG. 16 in which one or more embodiments for providing directional feedback in free space can operate. As shown in FIG. 18A, the multimedia console 52 has a central processing unit (CPU) 101 having a level 1 cache 103, a level 2 cache 105, and a flash ROM (Read Only Memory) 107. The level 1 cache 103 and a level 2 cache 105 temporarily store data and hence reduce the number of memory access cycles, thereby improving processing speed and throughput. The CPU 101 may be provided having more than one core, and thus, additional level 1 and level 2 caches 103 and 105. The flash ROM 107 may store executable code that is loaded during an initial phase of a boot process when the multimedia console 52 is powered ON.

A graphics processing unit (GPU) 109 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 52 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a Radio Frequency module, a cable modem, and the like. Furthermore, the wireless adapter card 148 acts as a wireless communication device such as a transceiver for communicating with the directional feedback device 204. The wireless communication protocol may be Radio Frequency (RF), Bluetooth or one of the IEEE 802 wireless based standards (e.g. 802.11 or 802.16 sets of standards) or any other suitable wireless communication protocol.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 52. The media drive 144 is connected to the I/O controller 120 via a bus, such as a Serial ATA bus or other high speed connection (e.g., IEEE 1394).

In one embodiment, a copy of the software and data for one or more force determination modules 323 can be stored on media drive 144 and can be loaded into system memory 143 when executing.

The system management controller 122 provides a variety of service functions related to assuring availability of the multimedia console 52. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 52. A system power supply module 136 provides power to the components of the multimedia console 52. A fan 138 cools the circuitry within the multimedia console 52.

The CPU 101, GPU 109, memory controller 110, and various other components within the multimedia console 52 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 52 is powered ON, application data may be loaded from the system memory 143 into memory 112 and/or caches 102, 104 and executed on the CPU 101. The application may present a graphical user interface that provides a consistent user experience when navigating to different media types available on the multimedia console 52. In operation, applications and/or other media contained within the media drive 144 may be launched or played from the media drive 144 to provide additional functionalities to the multimedia console 52.

The multimedia console 52 may be operated as a standalone system by simply connecting the system to a television or other display. In this standalone mode, the multimedia console 52 allows one or more users to interact with the system, watch movies, or listen to music. However, with the integration of broadband connectivity made available through the network interface 124 or the wireless adapter 148, the multimedia console 52 may further be operated as a participant in a larger network community.

When the multimedia console 52 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 52 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream without the gaming application's knowledge and a driver maintains state information regarding focus switches. The image capture system 60 may define additional input devices for the console 52 (e.g. for its camera system).

Figure 18B:
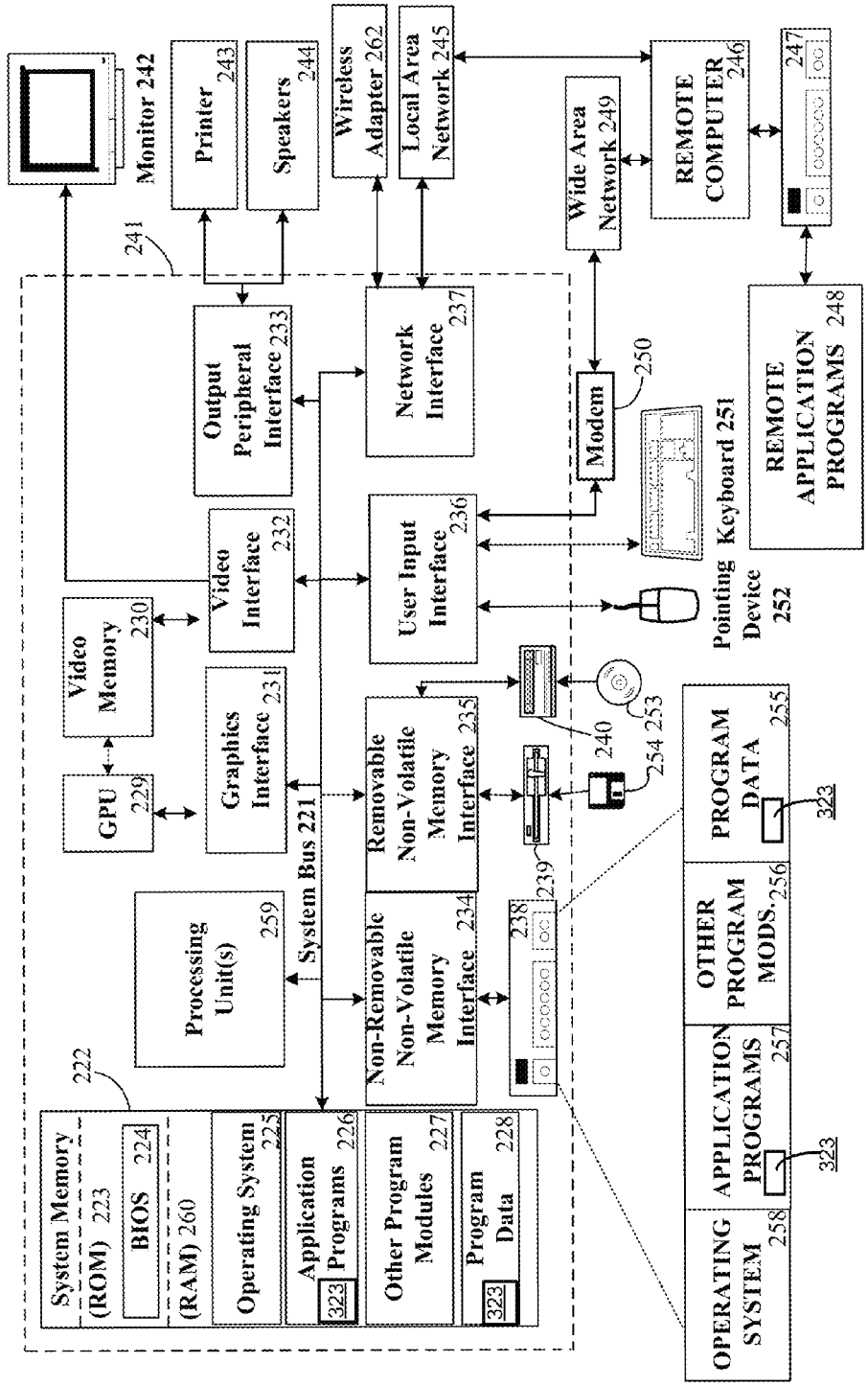
FIG. 18B illustrates another example embodiment of a computing environment in which one or more embodiments for providing directional feedback in free space can operate.

FIG. 18B illustrates another example embodiment of a computing environment 420 in which one or more embodiments for providing directional feedback in free space can operate. The computing environment 420 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4B illustrates operating system 225, application programs 226, other program modules 227, and program data 228.

The computer 241 may also include other removable/non-removable, volatile/nonvolatile computer storage media. By way of example only, FIG. 4B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4B, provide storage of computer readable instructions, data structures, program modules and other data for the computer 241. For example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies.

In one embodiment, a copy of the software and data for one or more force determination modules 323 can be stored in the application programs 257 and program data 255 stored on the hard drive 238 or remotely (e.g. 248). A copy 323 can also be loaded as an application program 226 and program data 228 in system memory 222 when executing.

A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The image capture system 60 may define additional input devices for the computer 241 (e.g. for its camera system). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4B. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 18B illustrates remote application programs 248 as residing on memory device 247. It will be appreciated that the network connections shown are exemplary and other means of establishing a communications link between the computers may be used.

The network interface 237 is also coupled to a wireless adapter 262 providing a wireless communication device such as a transceiver for communicating with the directional feedback device. Again, the wireless communication protocol may be Radio Frequency (RF), Bluetooth or one of the IEEE 802 wireless based standards (e.g. 802.11 or 802.16 sets of standards) or any other suitable wireless communication protocol.

Each of the illustrated computing system environments, 52, 420 and 470, is only one example of a suitable computing environment and is not intended to suggest any limitation as to the scope of use or functionality of the presently disclosed subject matter. Neither should the particular computing environment example be interpreted as having any dependency or requirement relating to any one or combination of components illustrated in its respective exemplary operating environment. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general-purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Figure 18C:
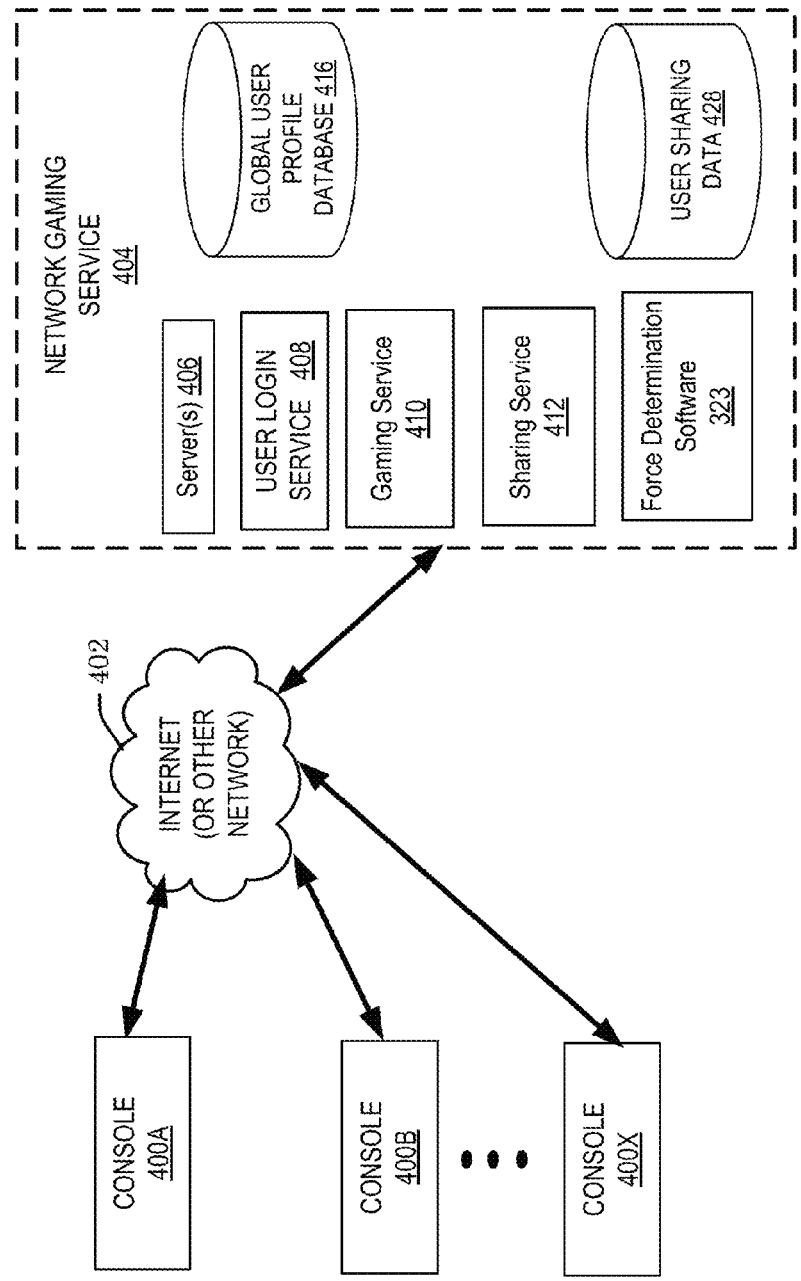
FIG. 18C illustrates an example embodiment of a networked computing environment in which one or more embodiments for providing directional feedback in free space can operate.

FIG. 18C illustrates an example embodiment of a networked computing environment in which one or more embodiments for providing directional force feedback can operate. As shown in FIG. 18C, multiple consoles 400A-400X or processing devices, such as those illustrated in FIGS. 18A and 18B may be coupled to a network 402 and can communicate with each other and a network gaming service 404 having one or more server(s) 406 via network 402. The server(s) 406 may include a communication component capable of receiving information from and transmitting information to consoles 400A-X and may provide a collection of services that applications running on consoles 400A-X may invoke and utilize.

Consoles 400A-X may invoke user login service 408, which is used to authenticate and identify a user on consoles 400A-X. During login, login service 408 obtains a gamer tag (a unique identifier associated with the user) and a password from the user as well as a console identifier that uniquely identifies the console that the user is using and a network path to the console. The gamer tag and password are authenticated by comparing them to a global user profile database 416, which may be located on the same server as user login service 408 or may be distributed on a different server or a collection of different servers. Once authenticated, user login service 408 stores the console identifier and the network path in the global user profile database 416 so that messages and information may be sent to the console.

In an embodiment, consoles 400A-X may include a gaming service 410, a sharing service 412, force determination software 323, and user sharing data 428. The gaming service may allow users to play online interactive games, create and share gaming environments for joint game play between consoles, and provide other services such as an online marketplace, centralized achievement tracking across various games and other shared experience functions. A sharing service 412 allows users to share game play elements with other users. For example, a user on a console 400x may create elements for use in games and share them or sell them to other users. In addition, a user may record elements of the game play experience, such as a movie of a race or various scenes in a game, and share them with other users. Information provided by users for sharing or sale may be stored in the user sharing data 428.

Besides sending the updated avatar and scene data to all the participating client computers, force determination software 323 of the network gaming service 404 can determine force producing events and determine the force vectors to be sent to each respective client computer. In a heavy action scene like a battle with many participants, this can help speed processing.

The global user profile database 416 may include information about all the users on consoles 400A-X such as the users' account information and a console identifier that uniquely identifies a particular console that each user is using. The global user profile database 416 may also include user preference information associated with all the users on consoles 400A-X. The global user profile database 416 may also include information about users such as game records and a friends list associated with users.

Any number of networked processing devices may be provided in accordance with a gaming system as provided in FIG. 4. As such, the technology presented herein may operate on one or more servers 406 in conjunction with a gaming service 404 or may be provided in individual processing devices in a networked environment, such as devices 400A-400*x*.

FIG. 19 illustrates an example embodiment of a target recognition, analysis, and tracking system 50 including an image capture system 60 that may be used with one or more embodiments. The image capture system 60 identifies human and non-human targets in a capture area and tracks them in three dimensional space.

It includes an image capture component 70 capable of capturing depth data in addition to color and line data. As shown in FIG. 19, according to an example embodiment, an capture component 70 may include an IR light component 72, a three-dimensional (3-D) camera 74, and a color (e.g. RGB) camera 76 that may be used to capture the depth image of a capture area. Various 3-D techniques can be used to determine depth data with the infrared (IR) component alone or in conjunction with the data from the other cameras. Some examples of such techniques include time of flight analysis, monitoring phase shift of outgoing and incoming signals, shuttered light pulse imaging, and structured light pattern processing. The depth data can represent distances of different points of an object or human from the capture component.

Color data from the color camera 76 can supplement the information from the 3-D camera 74 and IR component 72 to enable a more complete recognition of the human target's movement or position.

According to another embodiment, the capture system 60 may include two or more physically separated cameras that may view a capture area from different angles, to obtain visual stereo data that may be resolved to generate depth information.

The capture system 60 can capture data at interactive rates, increasing the fidelity of the data and allowing the disclosed techniques to process the raw depth data, digitize the objects in the scene, extract the surface and texture of the object, and perform any of these techniques in real-time such that the display (e.g. 56) can provide a real-time depiction of the scene on its display screen (e.g. 54).

In the system embodiment of FIG. 19, the image capture system 60 is communicatively coupled 84 to a computing environment 300, in this example a multimedia console. The communication coupling can be implemented in one or more wired or wireless connections such as, for example, a USB connection, a Firewire connection, an Ethernet cable connection, or the like and/or a wireless connection such as a wireless 802.11b, g, a, or n connection.

The capture system 60 further includes a memory component 82 for storing instructions that may be executed by the processor 80, as well as image data which may be captured in a frame format. The memory component 82 may include random access memory (RAM), read only memory (ROM), cache, Flash memory, a hard disk, or any other suitable storage component. In one embodiment, the memory component 82 may be a separate component in communication 90 with the image capture component 70 and the processor 80 as illustrated. According to another embodiment, the memory component 82 may be integrated into the processor 80 and/or the image capture component 70.

The capture system 60 further includes a processor 80 communicatively coupled 90 to the image capture component 70 to control it and the memory 82 for storing image data. The processor 80 may include a standardized processor, a specialized processor, a microprocessor, or the like that may execute instructions that may include instructions for storing profiles, receiving depth image data, storing the data in a specified format in memory 82, determining whether a suitable target may be included in the depth image, converting the suitable target into a skeletal representation or other type of model of the target, or any other suitable instruction. The inclusion of processing capabilities in the image capture system 60 enables a model such as a multi-point skeletal model, of a user and/or an object to be delivered in real-time. Furthermore, some of this processing may be executed by other processors (e.g. 101, 109, 259, 229, 304, 472) in one or more communicatively coupled computing environments.

The capture system 60 may further include a microphone 78 which can be used to receive audio signals produced by the user. Thus, in this embodiment, the image capture system 60 is an audiovisual data capture system. The microphone(s) in the capture system may be used to provide additional and supplemental information about a target to enable the system to better discern aspects of the target's position or movement. For example, the microphone(s) may comprise directional microphone(s) or an array of directional microphones that can be used to further discern the position of a human target or to distinguish between two targets.

Image data is captured iteratively, usually in frames. Differences in the captured image data are tracked based on the models and changes in the data. From these differences, a user's natural movements, and the movements of an object like the sword in FIG. 16 are tracked.

The technology is advantageously utilized in a target recognition, analysis, and tracking system such as that disclosed in U.S. patent application Ser. No. 12/475,094 entitled "Environment And/Or Target Segmentation", filed May 29, 2009 and hereby fully incorporated herein by reference; U.S. patent application Ser. No. 12/603,437, "Pose Tracking Pipeline," filed on Oct. 21, 2009, and hereby fully incorporated herein by reference; U.S. patent application Ser. No. 12/475,308, "Device for Identifying and Tracking Multiple Humans Over Time," filed on May 29, 2009, and hereby fully incorporated herein by reference; "Motion Detection Using Depth Images," filed on Dec. 18, 2009, and hereby fully incorporated herein by reference; U.S. patent application Ser. No. 12/575,388, "Human Tracking System," filed on Oct. 7, 2009, and hereby fully incorporated herein by reference U.S. patent application Ser. No. 12/422,661, "Gesture Recognizer System Architecture," filed on Apr. 13, 2009 and hereby fully incorporated herein by reference; and U.S. patent application Ser. No. 12/511,850, entitled "Auto Generating a Visual Representation," filed 29 Jul. 2009, fully incorporated herein by reference.

Figure 20A:
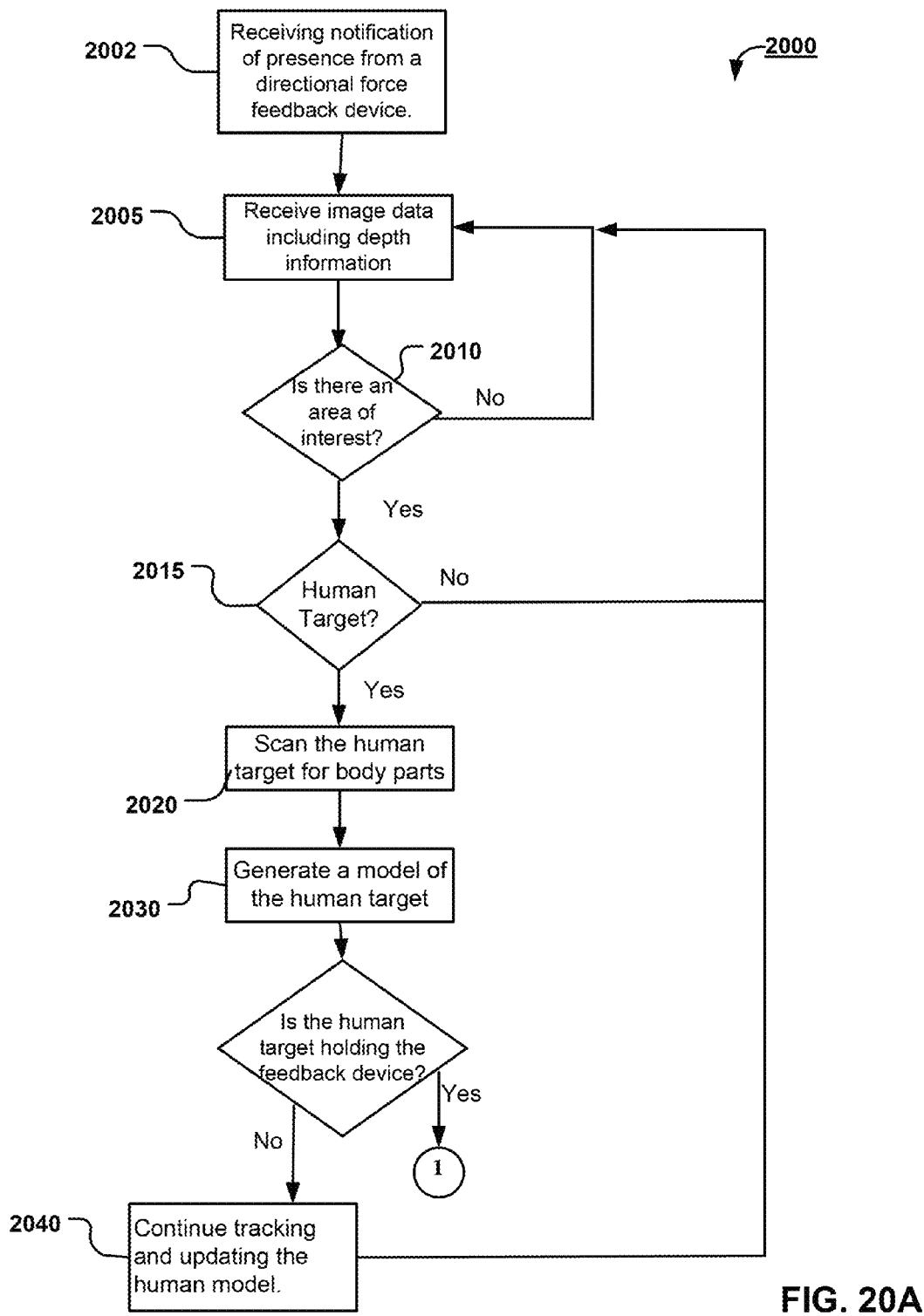
FIGS. 20A and 20B show a flowchart of a method embodiment for tracking a user holding a directional feedback device.
Figure 20B:
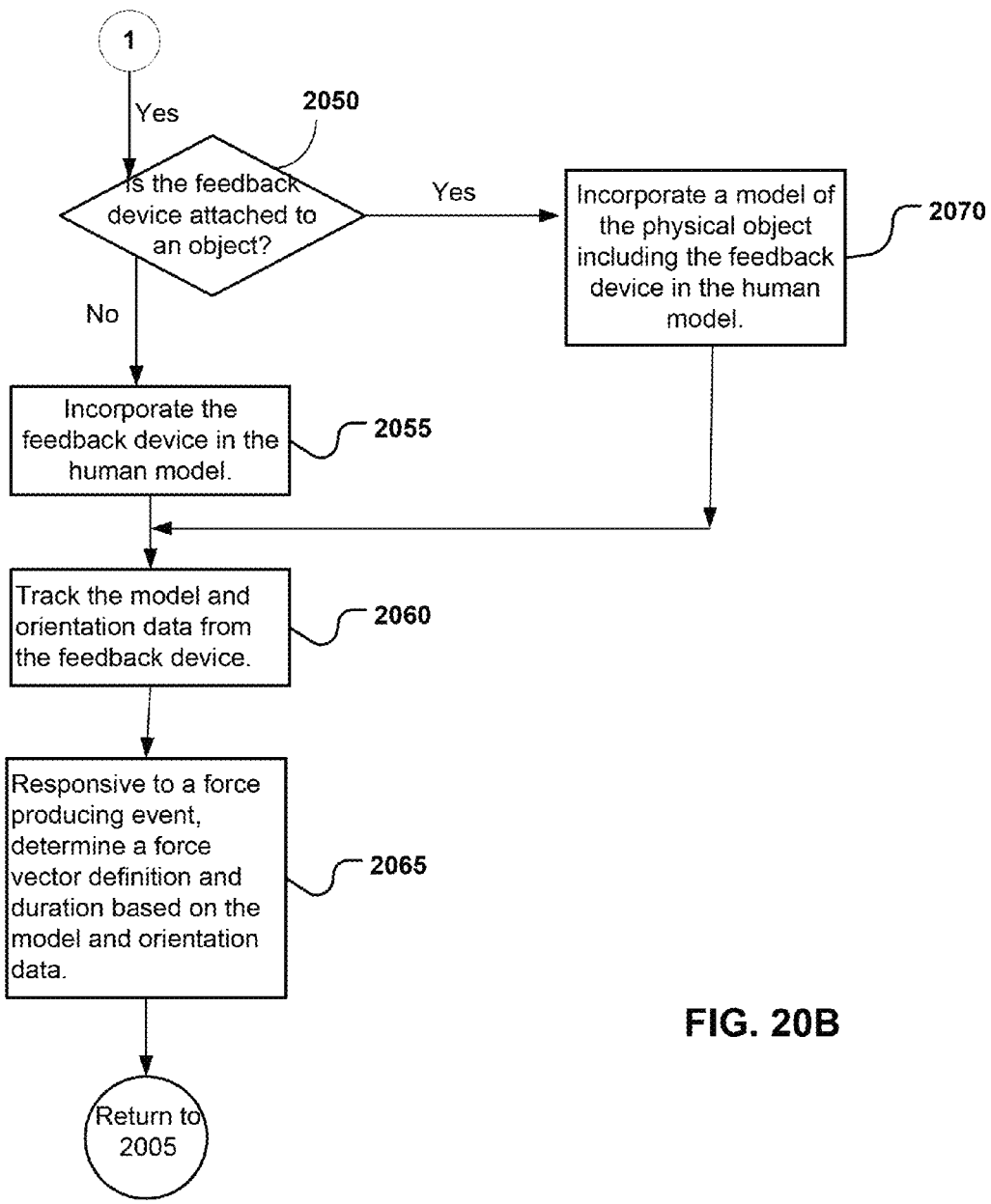

Identifying and tracking a target, be it human or non-human, is typically an iterative process. FIGS. 20A and 20B show a flowchart of a method embodiment 2000 for tracking a user holding a directional feedback device in order to determine whether a force producing event has occurred. In one embodiment, the processing is performed by an application executing on processor 80 in the image capture system or executing in computing environment 52 or a combination of both. For illustrative purposes only and not to be limiting thereof, the method embodiment is discussed with respect to such application software.

The executing application software receives 2002 notification of the presence of a directional force feedback device. For example, the controller 508 sends a message or orientation data from an accelerometer to alert the application of its presence. The application receives 2005 image data including depth data, and determines 2010 whether there is an area of interest. An area of interest may be a concentration of adjacent pixels having depth values in a very narrow range. The depth data in conjunction with edge detection results and the color data can determine whether an area of interest fits a pattern for a target type such as a human being or a sword or a racket, etc.

The application software applies pattern matching with a model based on a human skeletal form for instance in determining 2015 whether the area of interest is a human target or not. If it is, the application software scans the human target 2020 for body parts and generates a model for the captured human target 2030. For example, the software starts at a head area based on the model, and defines body parts from there such as shoulders based on patterns and updates to the pixel data over time. If not a human target, the application receives 2005 image data on the next iteration and does the processing continually.

Once a human has been identified, the application determines whether the human is holding the feedback device 204 which is present. If not, the application continues 2040 tracking and updating the human model and any new areas of interest as new data is received 2005 with each iteration.

If the human is holding the feedback device, the application determines 2050 whether the feedback device is attached to an object. The application can retrieve patterns of the types of objects it uses. For example, the application can be a sword fighting application which recognizes swords, shields, and items of that nature. The application may have patterns stored for physical objects of certain manufacturers that are specially made for attachment of a directional feedback device. A pattern of a directional feedback device type can also be applied. Additionally, an object model for the target can also be generated based on the observed features of the physical object.

If the feedback device in an unattached mode is being held by the modeled human, the application incorporates 2055 the feedback device in the human model, and tracks 2060 the human model and orientation data from the feedback device.

If the feedback device is attached to an object, the application can incorporate 2070 the model of the physical object including the feedback device in the human model. In other words, the human and object can be treated as one model. In other examples, the physical object model or feedback device model can be tracked separately if preferred, with reference to the human model. The application tracks 2060 the human model and orientation data from the feedback device.

Whether the feedback device alone is held or a physical object is attached to it, responsive to a force producing event, a force determining software module 323 determines a force vector definition and duration for the application based on the model and orientation data. For example, the force determining module 323 can execute a method embodiment like that of FIG. 6 and communicate the vector definition and duration to the directional force feedback device 204 for generation.

Figure 21A:
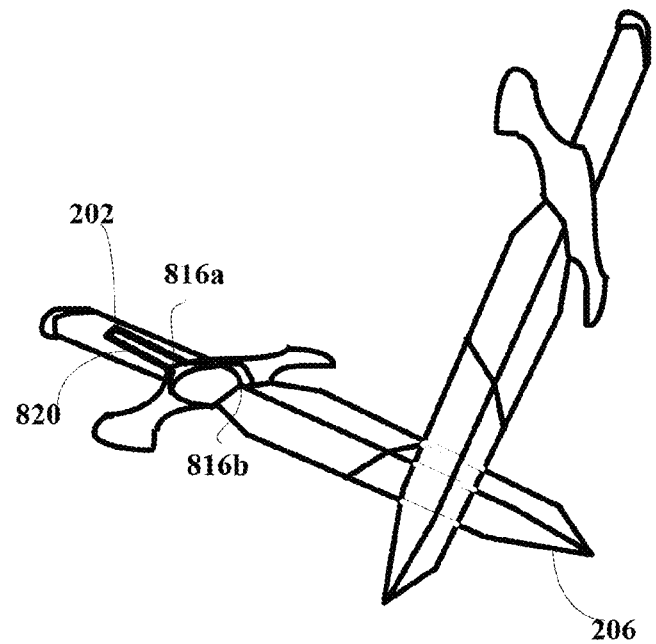
FIG. 21A illustrates a sword strike between two virtual swords.
Figure 21B:
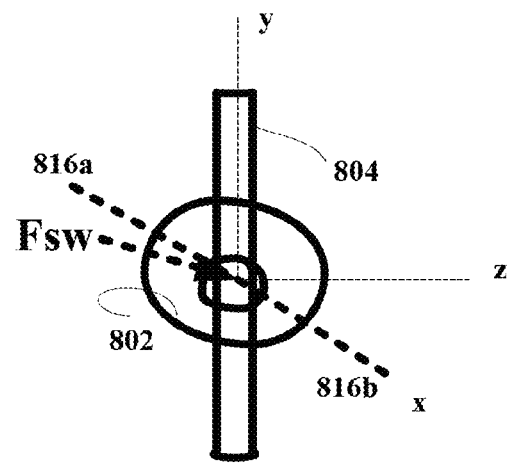
FIG. 21B illustrates a home position of a model of a force generation system in a directional feedback device.
Figure 21C:
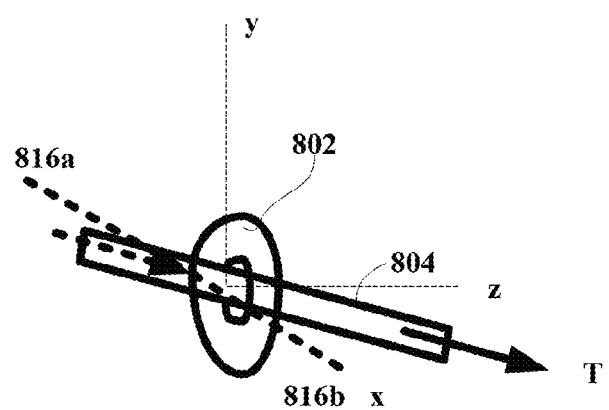
FIG. 21C shows a position the axial structure is sent to in response to the sword strike.

FIG. 21A illustrates a sword strike between two virtual swords. FIG. 21B illustrates a home position of a model of a force generation system 518 in a directional feedback device 204. FIG. 21C shows a position the axial structure 804 is sent to in response to the sword strike.

In FIG. 21A, virtual sword 201 strikes a virtual sword corresponding to physical sword 200 having attached directional force feedback device 204. FIG. 21B illustrates the force generation system 518 of the directional feedback device 204 before the contact assuming the sword 200 is stationary. The device 204 is in home position in this example. Its current orientation for the flat blade can be represented by considering the x axis running from supports 816a through 816b. Axial structure 804 is aligned along a y-axis.

Fsw is the virtual force being directed on the virtual counterpart of the physical sword. The force would push the blade 206 of the physical sword 200 down the y-axis (towards negative y) as well as at an angle approximately 45 degrees into a plane between the negative y and positive z axes.

In response to this as shown in FIG. 21C, the control system 810 would cause the pancake motors 832a and 832b to rotate the axial structure 804 so to align with the imaginary force Fsw vector. So the axial structure 804 would be rotated −45 degrees from the y-axis and extends from the negative y and z axes into a plane defined by the positive y and z axes. The disk is rotated so that the torque is directed into the plane defined by the x and z axes. In other words, the sword 200 torque magnitude is directed down and to the left of the sword handle 202 as a strike from the upper right would tend to push it.

FIGS. 22A and 22B illustrate another embodiment of a directional feedback device 2204. Device 2204 includes an outer housing 2206 formed in the shape of a sword to encase the mechanical and electrical components of the feedback device. A support 2208 provides structural rigidity for the force generation system, a power source 2010 (housed in a "handle" of the sword) and electrical components 2012 housed in the "blade" section of the sword. In this embodiment, the force generation system comprises a spherical rotating mass 802-1 housed in a rotating inner ring 806-1 which rotates within an outer ring support 822-1. Ring support 822-1 is coupled to support 2208. Inner ring 806-1 is coupled to ring support 822-1 by bearings 816-1 and 816-2. The ring support 802-1 allows the inner ring to rotate about axis N. Spherical mass 801-2 is coupled to shaft 2220 and rotates about axis N powered by an internally mounted motor 812-1 positioned within the mass 802-1. As viewed in FIG. 22A, inner ring 806-1 may rotated about axis M (and moved in the direction of arrows 2224, 2226) by a motor 2230 and deflection structure. The deflection structure includes a cross-beam 2232 is connected to inner ring 806-1 and by arms 2234, 2236 to crossbeam 2238. Cross beam 2238 is rotated by motor 2230.

The technology may be embodied in other specific forms without departing from the spirit or essential characteristics thereof. Likewise, the particular naming and division of modules, routines, features, attributes, methodologies and other aspects are not mandatory, and the mechanisms that implement the present technology or its features may have different names, divisions and/or formats. Furthermore, as will be apparent to one of ordinary skill in the relevant art, the modules, routines, features, attributes, methodologies and other aspects of the embodiments disclosed can be implemented as software, hardware, firmware or any combination of the three. Of course, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of programming.

The foregoing detailed description has been presented for purposes of illustration and description. It is not intended to be exhaustive or to limit the technology disclosed to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. Moreover, it should be noted that the language used in the specification has been principally selected for readability and instructional purposes. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing directional force feedback in free space to a user, comprising:
providing a mass rotatable about a movable first axis, the mass and movable axis being responsive to a control signal to generate a force vector having a direction and a magnitude in three dimensional space; and
rotating the mass about at least the first axis to generate the force vector responsive to an application executing in a processing device, the application under control of the user and displaying events to the user, the force vector representing feedback regarding an event in the application.

2. The method of claim 1 wherein the rotating comprises rotating the mass about the movable first axis while simultaneously moving the movable first axis to generate the force vector.

3. The method of claim 1 wherein the providing includes providing the mass centered about an axial structure and which generates a torque magnitude representative of the magnitude for the force vector by controlling a speed of the mass spinning about the axial structure.

4. The method of claim 3 wherein the rotating comprises generating the direction for the force vector by moving the axial structure to generate a torque in the direction of the force vector, the torque having the torque magnitude.

5. The method of claim 4 wherein moving the axial structure about which the mass spins includes tilting the axial structure.

6. The method of claim 3 comprising the additional step of rotating the axial structure to a desired position.

7. The method of claim 3 wherein the mass has a home position from which an angle of a tilting of the axial structure is referenced.

8. The method of claim 7 wherein the home position comprises the axial structure being in alignment with a home position reference point.

9. In a system including a computer executing an application communicatively coupled to a directional force feedback device, a method for providing directional force feedback to a device held by a user in free space and connected to the directional force feedback device, comprising:
determining when a force producing event has occurred in the application;
responsive to an occurrence of a force producing event which creates a force having a force vector, determining a duration for the force vector based on the force producing event;
determining a direction for the force vector in three dimensions with respect to an orientation reference position on the device connected to the force feedback device; and
generating the force vector for the force duration by rotating a mass in the force feedback device, the mass being rotatable about a first axis and a second axis orthogonal to the first axis, the mass rotating to generate the force vector in the determined direction and for the determined duration.

10. The method of claim 9 wherein determining a force vector with respect to an orientation reference position comprises determining a force direction with respect to the orientation reference position and a force magnitude of the force vector.

11. The method of claim 10 wherein the force producing event represents an action in the application which is displayed to the user contemporaneously with generating the force vector.

12. The method of claim 11 wherein determining a force producing event comprises determining the force producing event with respect to a virtual object based on motion characteristics for a physical object to which the directional force feedback device is attached.

13. The method of claim 12 further comprising:
receiving the motion characteristics including orientation data from the free space directional feedback device; and
using the motion characteristics for determining the force direction, force magnitude, and duration of the force vector.

14. The method of claim 13 further comprising determining motion characteristics of the virtual object based on image data of the physical object and using the motion characteristics of the virtual object for determining the force direction, force magnitude, and duration of the force vector which is to be generated by the feedback device.

15. The method of claim 14 wherein the force vector has a magnitude, the magnitude is set proportional to the virtual object's force in a context of the executing application.

16. A computer storage device having instructions to direct one or more processors to perform a method for providing directional force feedback to a feedback device held by a user, comprising:
determining when a force producing event has occurred in execution of an application, the application being under control of the user and displaying one or more events to the user, a force vector representing feedback regarding the force producing event in the application;
responsive to an occurrence of a force producing event which creates a force having a force vector, determining a duration of the force based on the force producing event;
determining the direction of the force vector with respect to an orientation reference position, the orientation reference position being a position in the feedback device; and
communicating the force vector and force duration to the device to rotate a mass, the mass rotatable about a first axis and a second axis perpendicular to the first axis, the rotation of the mass generating the force vector having the direction and a magnitude in three dimensional space.

17. The computer storage device of claim 16 wherein the mass is the mass centered about an axial structure, the computer storage medium having instructions to direct at least one or more of the processors to control a force generation module to generate a torque magnitude representative of the magnitude for the force vector by controlling a speed of the mass spinning about the axial structure, the method further comprising:
determining whether the mass is in a home position;
responsive to the mass not being in the home position, returning the mass to home position by aligning the axial structure with a home position reference point;
from the home position, moving the axial structure to a position where an end of the axial structure points in the direction for the force vector; and rotating the mass about the axial structure to generate a torque representative of the magnitude of the force vector and which torque is directed out of the end of the axial structure pointing in a direction orthogonal to the physical force vector.

18. The computer storage device of claim 17 wherein the method further comprises receiving orientation data from the feedback device; and determining the orientation of a physical object attached to the feedback device based on the orientation data.

19. The computer storage device of claim 18 wherein the method further comprises determining when a force-producing event with respect to a virtual object has occurred based on motion characteristics for the physical object to which the mass is attached.

20. The computer storage device of claim 19 wherein the motion characteristics are determined from orientation data from the feedback device coupled to the one or more of processors providing image data of the physical object.

* * * * *